United States Patent [19]

Yano

[11] Patent Number: 5,557,797
[45] Date of Patent: Sep. 17, 1996

[54] SCHEDULING METHOD FOR AUTOMATICALLY DEVELOPING HARDWARE PATTERNS FOR INTEGRATED CIRCUITS

[75] Inventor: Takanori Yano, Tokyo, Japan

[73] Assignee: Ricoh Company, Ltd., Tokyo, Japan

[21] Appl. No.: 571,277

[22] Filed: Dec. 12, 1995

Related U.S. Application Data

[63] Continuation of Ser. No. 201,615, Feb. 24, 1994.

[30] Foreign Application Priority Data

Feb. 25, 1993 [JP] Japan .................... 5-061062

[51] Int. Cl.$^6$ ..................................... G06F 9/44
[52] U.S. Cl. ............... 395/650; 364/281.6; 364/281.8; 364/261.3; 364/262.4; 364/938; 395/375
[58] Field of Search ............................................. 395/650

[56] References Cited

PUBLICATIONS

Hwang et al, Constrained Conditional Resource Sharing in Pipeline Synthesis, CAD, 1988 International Conf., 1988, pp. 52–55.
Kim et al, A Scheduling Algorithm for Conditional Resource Sharing, CAD, 1991 International Conf. pp. 84–87.
Parker et al, MAHA: A Program for Datapath Synthesis, 23rd Design Automation Conference, 1986, pp. 461–466.
Paulin et al, Force–Directed Scheduling for the Behavioral Synthesis of ASIC's, IEEE Transactions on CAD vol. 8 No. 6 Jun. 1989.
Rewini et al, Scheduling Task Graphs Containing Branches on Parallel Systems, System Sciences, 1991 Annual Hawai Int. Conf. pp. 448–457.
McFarland, et al., "Tutorial on High–Level Synthesis," 25th ACM/IEEE Design Conference, Paper 23.1, pp. 330–336, 1988 IEEE.
McFarland, et al., "The High–Level Synthesis of Digital Systems," Proceedings of the IEEE, vol. 78, No. 2, pp. 301–318, Feb. 1990.

*Primary Examiner*—Kevin A. Kriess
*Assistant Examiner*—Lucien Toplu
*Attorney, Agent, or Firm*—Cooper & Dunham LLP

[57] ABSTRACT

A scheduling method for scheduling a program comprises the steps of: extracting a plurality of traces from a given program such that each of the traces contains a plurality of program blocks executed sequentially, each of the plurality of program blocks containing one or more operators to be executed by arithmetic units of a computer and being separated from another program block in the trace by a branching step that causes a branching to or from a program block outside of the trace; extracting, in each of the plurality of traces, a critical path of the operation conducted by the operators in the trace, the critical path being formed of a plurality of reference operators, the rest of the operators forming movable operators that are conducted concurrently with one or more of the reference operators; and scheduling, in each of the traces, the processing steps of the movable operators such that the maximum of the number of the movable operators conducted concurrently to a reference operator in a given trace, is minimized.

6 Claims, 37 Drawing Sheets

FIG.8

```
/* ++++ Example Program 01 ++++ */ example ( )
{
        /* - - - Block A - - - - */
        Y1 = I1 + I2 ;   /* OprNo.1 */
        Y2 = Y1 + I2 ;   /* OprNo.2 */
        Y3 = Y2 - I4 ;   /* OprNo.3 */
        Y15 = I5 + I6 ;  /* OprNo.15 */ if (Y15 < Y3)
                /* - - - Block B1 - - - */
                Y5 = I7 - Y3 ;   /* OprNo.5 */
        else {
                /* - - - Block B2 - - - */
                Y6 = Y3 - I9 ;       /* OprNo.6 */
                Y9 = Y6 + I10 ;      /* OprNo.9 */
                Y17 = I11 - I12 ;    /* OprNo.17 */
                Y18 = I13 - I14 ;    /* OprNo.18 */
                Y8 = Y17 + Y18 ;     /* OprNo.8 */
                Y16 = I15 - I16 ;    /* OprNo.16 */
                Y19 = I17 + I18 ;    /* OprNo.19 */
                Y7 = Y16 - I19 ;     /* OprNo.7 */
                Z20 = Y8 - Y7 ;      /* OprNo.20 */
                Y5 = Y9 - Y8 ;       /* OprNo.10 */
        }

/* - - - Block C - - - */
        Y12 = I20 - Y5 ;   /* OprNo.12 */
        Z11 = Y5 + I21 ;   /* OprNo.11 */
        Y14 = I22 + I23 ;  /* OprNo.14 */
        Y13 = Y12 - Y14 ;  /* OprNo.13 */
        Z21 = Y13 - I24 ;  /* OprNo.21 */
```

FIG.11

| OPERATOR DEPENDED ON | 1 | 2 | 3 | 3 | 4 | 5 | 5 | 5 | 7 | 8 | 9 | 10 | 10 | 12 | 14 | 15 |
|---|---|---|---|---|---|---|---|---|---|---|---|---|---|---|---|---|
| DEPENDANT OPERATOR | 2 | 3 | 6 | 9 | 5 | 5 | 6 | 11 | 12 | 8 | 10 | 10 | 11 | 12 | 13 | 13 | 6 |

FIG.12

| OPERATOR ID NUMBER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| OPERATOR TYPE | - | + | - | - | + | - | + | + | - | + | - | + | + | - | + |
| BLOCK ID | A | A | A | B1 | B1 | B1 | B2 | B2 | B2 | B2 | C | C | C | C | B1 |

FIG.13

| BLOCK DEPENDED ON | A | A | B1 | B2 |
|---|---|---|---|---|
| DEPENDENT BLOCK | B1 | B2 | C | C |

FIG.17

| OPERATOR DEPENDED ON | 1 | 2 | 3 | 9 | 7 | 8 | 10 | 10 | 12 | 14 |
|---|---|---|---|---|---|---|---|---|---|---|
| DEPENDENT OPERATOR | 2 | 3 | 9 | 10 | 8 | 10 | 11 | 12 | 13 | 13 |

FIG.18

| OPERATOR ID | 1 | 2 | 3 | 7 | 8 | 9 | 10 | 11 | 12 | 13 | 14 |
|---|---|---|---|---|---|---|---|---|---|---|---|
| DEPENDENT OPERATOR | 2 | 3 | 9 | 8 | 10 | 10 | 11, 12 | | 13 | | 13 |

FIG.19

| OPERATOR ID | 1 | 2 | 3 | 7 | 8 | 9 | 10 | 11 | 12 | 13 | 14 |
|---|---|---|---|---|---|---|---|---|---|---|---|
| OPERATOR DEPENDED ON | | 1 | 2 | | 7 | 3 | 8, 9 | 10 | 10 | 12, 14 | |

FIG.20

| OPERATOR ID | 1 | 2 | 3 | 7 | 8 | 9 | 10 | 11 | 12 | 13 | 14 |
|---|---|---|---|---|---|---|---|---|---|---|---|
| DEPENDENT OPERATOR | 2<br>3<br>9<br>10<br>11<br>12<br>13 | 3<br>9<br>10<br>11<br>12<br>13 | 9<br>10<br>11<br>12<br>13 | 8<br>10<br>11<br>12<br>13 | 10<br>11<br>12<br>13 | 10<br>11<br>12<br>13 | 11<br>12<br>13 |  | 13 |  | 13 |

FIG.21

| OPERATOR ID | 1 | 2 | 3 | 7 | 8 | 9 | 10 | 11 | 12 | 13 | 14 |
|---|---|---|---|---|---|---|---|---|---|---|---|
| OPERATOR DEPENDED ON |  | 1 | 1<br>2 |  | 7 | 1<br>2<br>3 | 1<br>2<br>3<br>7<br>8<br>9 | 1<br>2<br>3<br>7<br>8<br>9<br>10 | 1<br>2<br>3<br>7<br>8<br>9<br>10 | 1<br>2<br>3<br>7<br>8<br>9<br>10<br>12<br>14 |  |

FIG.26

| | | MOVABLE OPERATOR | | | | NUMBER OF POSSIBLE LOCATIONS (STEPS) |
|---|---|---|---|---|---|---|
| | | 7 | 8 | 11 | 14 | |
| REFERENCE OPERATOR | 1 | 1 | | | 1 | 2 |
| | 2 | 1 | 1 | | 1 | 3 |
| | 3 | 1 | 1 | | 1 | 3 |
| | 9 | | 1 | | 1 | 2 |
| | 10 | | | | 1 | 1 |
| | 12 | | | 1 | 1 | 2 |
| | 13 | | | 1 | | 1 |
| MOBILITY LEVEL | | 3 | 3 | 2 | 8 | |

FIG.27

| | | MOVABLE OPERATOR | | | | | NUMBER OF POSSIBLE LOCATIONS (STEPS) |
|---|---|---|---|---|---|---|---|
| | | 4 | 8 | 11 | 14 | 15 | |
| REFERENCE OPERATOR | 1 | 1 | | | 1 | 1 | 3 |
| | 2 | 1 | | | 1 | 1 | 3 |
| | 3 | 1 | | | 1 | 1 | 3 |
| | 5 | | | | 1 | 1 | 2 |
| | 12 | | 1 | 1 | 1 | 1 | 4 |
| | 13 | | 1 | 1 | | | 2 |
| MOBILITY LEVEL | | 3 | 2 | 2 | 5 | 5 | |

FIG.29

| | MOVABLE OPERATOR | | | | | | | NUMBER OF POSSIBLE LOCATIONS (STEPS) |
|---|---|---|---|---|---|---|---|---|
| REFERENCE OPERATOR | | 4 | 6 | 7 | 8 | 11 | 14 | 15 | |
| | 1 | 1 | | 1 | | | 1 | 1 | 4 |
| | 2 | 1 | | 1 | 1 | | 1 | 1 | 5 |
| | 3 | 1 | | 1 | 1 | | 1 | 1 | 5 |
| | 5 | | | | | | 1 | 1 | 2 |
| | 9 | | | | 1 | | 1 | | 2 |
| | 10 | | | | | | 1 | | 1 |
| | 12 | | 1 | | | 1 | 1 | 1 | 4 |
| | 13 | | 1 | | | 1 | | | 2 |
| MOBILITY LEVEL | | 3 | 2 | 3 | 3 | 2 | 7 | 5 | |

FIG.30

| MOVABLE OPERATOR | 4 | 6 | 7 | 8 | 11 | 14 | 15 |
|---|---|---|---|---|---|---|---|
| CONCURRENTLY EXECUTABLE REFERENCE OPERATORS | 1 2 3 | 12 13 | 1 2 3 | 2 3 9 | 12 13 | 1 2 3 5 9 5 10 12 | 1 2 3 5 12 |

FIG.32

| MOVABLE OPERATOR | 14 |
|---|---|
| BLOCK WITHIN WHICH MOVABLE OPERATOR MAY BE ACTIVATED | B1 (5), B2 (9,10) |

FIG.34

|  |  | MOVABLE OPERATOR ||||||| 
|---|---|---|---|---|---|---|---|---|
|  |  | 4 | 6 | 7 | 8 | 11 | 14 | 15 |
| REFERENCE OPERATOR | 1  | 1(0) |      | 1(0) |      |      | 1(0) | 1(0) |
|                    | 2  | 1(0) |      | 1(0) | 1(0) |      | 1(0) | 1(0) |
|                    | 3  | 1(0) |      | 1(0) | 1(0) |      | 1(0) | 1(0) |
|                    | 5  |      |      |      |      |      | 1(0) | 1(0) |
|                    | 9  |      |      |      | 1(0) |      | 1(0) |      |
|                    | 10 |      |      |      |      |      | 1(0) |      |
|                    | 12 |      | 1(0) |      |      | 1(0) | 1(0) | 1(0) |
|                    | 13 |      | 1(0) |      |      | 1(0) |      |      |

FIG.35

|  |  | MOVABLE OPERATOR ||||||| 
|---|---|---|---|---|---|---|---|---|
|  |  | 4 | 6 | 7 | 8 | 11 | 14 | 15 |
| REFERENCE OPERATOR | 1  | 1(0) |      | 1(0) |      |      | 1(2) | 1(0) |
|                    | 2  | 1(0) |      | 1(0) | 1(0) |      | 1(2) | 1(0) |
|                    | 3  | 1(0) |      | 1(0) | 1(0) |      | 1(2) | 1(0) |
|                    | 5  |      |      |      |      |      | 1(1) | 1(0) |
|                    | 9  |      |      |      | 1(0) |      | 1(2) |      |
|                    | 10 |      |      |      |      |      | 1(1) |      |
|                    | 12 |      | 1(0) |      |      | 1(0) | 1(2) | 1(0) |
|                    | 13 |      | 1(0) |      |      | 1(0) |      |      |

FIG.36

| | | MOVABLE OPERATOR | | | | | | |
|---|---|---|---|---|---|---|---|---|
| | | 4 | 6 | 7 | 8 | 11 | 14 | 15 |
| REFERENCE OPERATOR | 1 | 1(0) | | 1(0) | | | 1(2) | 1(0) |
| | 2 | 1(0) | | 1(0) | 1(0) | | 1(2) | 1(0) |
| | 3 | 1(0) | | 1(0) | 1(0) | | 1(2) | 1(0) |
| | 5 | | | | | | 1(1) | 1(0) |
| | 9 | | | | 1(0) | | 1(2) | |
| | 10 | | | | | | 1(1) | |
| | 12 | | 1(2) | | | 1(0) | 1(2) | 1(0) |
| | 13 | | 1(1) | | | 1(0) | | |

FIG.37

| | | MOVABLE OPERATOR | | | | | | |
|---|---|---|---|---|---|---|---|---|
| | | 4 | 6 | 7 | 8 | 11 | 14 | 15 |
| REFERENCE OPERATOR | 1 | 1(0) | | 1(0) | | | 1(2) | 1(0) |
| | 2 | 1(0) | | 1(0) | 1(0) | | 1(2) | 1(0) |
| | 3 | 1(0) | | 1(0) | 1(0) | | 1(2) | 1(0) |
| | 5 | | | | | | 1(1) | 1(0) |
| | 9 | | | | 1(0) | | 1(2) | |
| | 10 | | | | | | 1(1) | |
| | 12 | | 1(2) | | | 1(1) | 1(2) | 1(0) |
| | 13 | | 1(1) | | | 1(2) | | |

FIG.38

| | | MOVABLE OPERATOR | | | | | | |
|---|---|---|---|---|---|---|---|---|
| | | 4 | 6 | 7 | 8 | 11 | 14 | 15 |
| REFERENCE OPERATOR | 1 | 1(0) | | 1(0) | | | 1(2) | 1(0) |
| | 2 | 1(0) | | 1(0) | 1(2) | | 1(2) | 1(0) |
| | 3 | 1(0) | | 1(0) | 1(2) | | 1(2) | 1(0) |
| | 5 | | | | | | 1(1) | 1(0) |
| | 9 | | | | 1(1) | | 1(2) | |
| | 10 | | | | | | 1(1) | |
| | 12 | | 1(2) | | | 1(1) | 1(2) | 1(0) |
| | 13 | | 1(1) | | | 1(2) | | |

FIG.39

| | | MOVABLE OPERATOR | | | | | | |
|---|---|---|---|---|---|---|---|---|
| | | 4 | 6 | 7 | 8 | 11 | 14 | 15 |
| REFERENCE OPERATOR | 1 | 1(1) | | 1(0) | | | 1(2) | 1(0) |
| | 2 | 1(2) | | 1(0) | 1(2) | | 1(2) | 1(0) |
| | 3 | 1(2) | | 1(0) | 1(2) | | 1(2) | 1(0) |
| | 5 | | | | | | 1(1) | 1(0) |
| | 9 | | | | 1(1) | | 1(2) | |
| | 10 | | | | | | 1(1) | |
| | 12 | | 1(2) | | | 1(1) | 1(2) | 1(0) |
| | 13 | | 1(1) | | | 1(2) | | |

FIG.40

| | | MOVABLE OPERATOR | | | | | | |
|---|---|---|---|---|---|---|---|---|
| REFERENCE OPERATOR | | 4 | 6 | 7 | 8 | 11 | 14 | 15 |
| | 1 | 1(1) | | 1(2) | | | 1(2) | 1(0) |
| | 2 | 1(2) | | 1(1) | 1(2) | | 1(2) | 1(0) |
| | 3 | 1(2) | | 1(2) | 1(2) | | 1(2) | 1(0) |
| | 5 | | | | | | 1(1) | 1(0) |
| | 9 | | | | 1(1) | | 1(2) | |
| | 10 | | | | | | 1(1) | |
| | 12 | | 1(2) | | | 1(1) | 1(2) | 1(0) |
| | 13 | | 1(1) | | | 1(2) | | |

FIG.41

| | | MOVABLE OPERATOR | | | | | | |
|---|---|---|---|---|---|---|---|---|
| REFERENCE OPERATOR | | 4 | 6 | 7 | 8 | 11 | 14 | 15 |
| | 1 | 1(1) | | 1(2) | | | 1(2) | 1(2) |
| | 2 | 1(2) | | 1(1) | 1(2) | | 1(2) | 1(2) |
| | 3 | 1(2) | | 1(2) | 1(2) | | 1(2) | 1(1) |
| | 5 | | | | | | 1(1) | 1(2) |
| | 9 | | | | 1(1) | | 1(2) | |
| | 10 | | | | | | 1(1) | |
| | 12 | | 1(2) | | | 1(1) | 1(2) | 1(2) |
| | 13 | | 1(1) | | | 1(2) | | |

FIG.42

| MOVABLE OPERATOR | 4 | 6 | 7 | 8 | 11 | 14 | 15 |
|---|---|---|---|---|---|---|---|
| ALLOCATION MARGIN POINT | 0 | 0 | 0 | 0 | 0 | 0 | 0 |
| ALLOCATION COMPLETION FLAG | 0 | 0 | 0 | 0 | 0 | 0 | 0 |
| ALLOCATION DESTINATION REFERENCE OPERATOR | 0 | 0 | 0 | 0 | 0 | 0 | 0 |
| CONCURRENTLY EXECUTABLE REFERENCE OPERATOR ID('S) FOLLOWED BY ALLOCATION FINALIZATION POINT AND ALLOCATION POINT | 1,0,4 2,0,5 3,0,5 | 12,0,4 13,0,2 | 1,0,4 2,0,5 3,0,5 | 2,0,5 3,0,5 9,0,2 | 12,0,4 13,0,2 | 1,0,4 2,0,5 3,0,5 5/9,0,2 5/10,0,1 12,0,4 | 1,0,4 2,0,5 3,0,5 5,0,2 12,0,4 |
| SELECTED REFERENCE OPERATOR WITH GREATEST ALLOCATION FINALIZATION POINT AND SMALLEST ALLOCATION POINT | 1,0,4 | 13,0,2 | 1,0,4 | 9,0,2 | 13,0,2 | 5/10,0,1 | 5,0,2 |

FIG.43

| MOVABLE OPERATOR | 4 | 6 | 7 | 8 | 11 | 14 | 15 |
|---|---|---|---|---|---|---|---|
| ALLOCATION MARGIN POINT | 3 | 2 | 3 | 5 | 2 | 4 | 4 |
| ALLOCATION COMPLETION FLAG | 0 | 0 | 0 | 0 | 0 | 1 | 0 |
| ALLOCATION DESTINATION REFERENCE OPERATOR | 0 | 0 | 0 | 0 | 0 | 5/9 | 0 |
| CONCURRENTLY EXECUTABLE REFERENCE OPERATOR ID('S) FOLLOWED BY ALLOCATION FINALIZATION POINT AND ALLOCATION POINT | 1,1,3 2,1,4 3,1,4 | 12,1,3 13,1,2 | 1,1,3 2,1,4 3,1,4 | 2,1,4 3,1,4 9,1,1 | 12,1,3 13,1,2 | | 1,1,3 2,1,4 3,1,4 5,0,1 12,1,3 |
| SELECTED REFERENCE OPERATOR WITH GREATEST ALLOCATION FINALIZATION POINT AND SMALLEST ALLOCATION POINT | 1,1,3 | 13,1,2 | 1,1,3 | 9,1,1 | 13,1,2 | | 1,1,3 |

FIG.44

| MOVABLE OPERATOR | 4 | 6 | 7 | 8 | 11 | 14 | 15 |
|---|---|---|---|---|---|---|---|
| ALLOCATION MARGIN POINT | 3 | | 3 | 3 | 1 | | 4 |
| ALLOCATION COMPLETION FLAG | 0 | 1 | 0 | 0 | 0 | 1 | 0 |
| ALLOCATION DESTINATION REFERENCE OPERATOR | 0 | 13 | 0 | 0 | 0 | 5/9 | 0 |
| CONCURRENTLY EXECUTABLE REFERENCE OPERATOR ID('S) FOLLOWED BY ALLOCATION FINALIZATION POINT AND ALLOCATION POINT | 1,1,3<br>2,1,4<br>3,1,4 | | 1,1,3<br>2,1,4<br>3,1,4 | 2,1,4<br>3,1,4<br>9,1,1 | 12,1,2<br>13,0,1 | | 1,1,3<br>2,1,4<br>3,1,4<br>5,0,1<br>12,1,2 |
| SELECTED REFERENCE OPERATOR WITH GREATEST ALLOCATION FINALIZATION POINT AND SMALLEST ALLOCATION POINT | 1,1,3 | | 1,1,3 | 9,1,1 | 12,1,2 | | 12,1,2 |

FIG.45

| MOVABLE OPERATOR | 4 | 6 | 7 | 8 | 11 | 14 | 15 |
|---|---|---|---|---|---|---|---|
| ALLOCATION MARGIN POINT | 3 | | 3 | 3 | | | 3 |
| ALLOCATION COMPLETION FLAG | 0 | 1 | 0 | 0 | 1 | 1 | 0 |
| ALLOCATION DESTINATION REFERENCE OPERATOR | 0 | 13 | 0 | 0 | 12 | 5/9 | 0 |
| CONCURRENTLY EXECUTABLE REFERENCE OPERATOR ID('S) FOLLOWED BY ALLOCATION FINALIZATION POINT AND ALLOCATION POINT | 1,1,3<br>2,1,4<br>3,1,4 | | 1,1,3<br>2,1,4<br>3,1,4 | 2,1,4<br>3,1,4<br>9,1,1 | | | 1,1,3<br>2,1,4<br>3,1,4<br>5,0,1<br>12,0,1 |
| SELECTED REFERENCE OPERATOR WITH GREATEST ALLOCATION FINALIZATION POINT AND SMALLEST ALLOCATION POINT | 1,1,3 | | 1,1,3 | 9,1,1 | | | 1,1,3 |

FIG.46

| MOVABLE OPERATOR | 4 | 6 | 7 | 8 | 11 | 14 | 15 |
|---|---|---|---|---|---|---|---|
| ALLOCATION MARGIN POINT | 3 | | 3 | | | | 3 |
| ALLOCATION COMPLETION FLAG | 0 | 1 | 0 | 1 | 1 | 1 | 0 |
| ALLOCATION DESTINATION REFERENCE OPERATOR | 0 | 13 | 0 | 9 | 12 | 5/9 | 0 |
| CONCURRENTLY EXECUTABLE REFERENCE OPERATOR ID('S) FOLLOWED BY ALLOCATION FINALIZATION POINT AND ALLOCATION POINT | 1,1,3 2,1,3 3,1,3 | | 1,1,3 2,1,3 3,1,3 | | | | 1,1,3 2,1,3 3,1,3 5,0,1 12,0,1 |
| SELECTED REFERENCE OPERATOR WITH GREATEST ALLOCATION FINALIZATION POINT AND SMALLEST ALLOCATION POINT | 1,1,3 | | 1,1,3 | | | | 1,1,3 |

FIG.47

| MOVABLE OPERATOR | 4 | 6 | 7 | 8 | 11 | 14 | 15 |
|---|---|---|---|---|---|---|---|
| ALLOCATION MARGIN POINT | | | 2 | | | | 2 |
| ALLOCATION COMPLETION FLAG | 1 | 1 | 0 | 1 | 1 | 1 | 0 |
| ALLOCATION DESTINATION REFERENCE OPERATOR | 1 | 13 | 0 | 9 | 12 | 5/9 | 0 |
| CONCURRENTLY EXECUTABLE REFERENCE OPERATOR ID('S) FOLLOWED BY ALLOCATION FINALIZATION POINT AND ALLOCATION POINT | | | 1,0,2 2,1,2 3,1,2 | | | | 1,0,2 2,1,2 3,1,2 5,0,1 12,0,1 |
| SELECTED REFERENCE OPERATOR WITH GREATEST ALLOCATION FINALIZATION POINT AND SMALLEST ALLOCATION POINT | | | 2,1,2 | | | | 2,1,2 |

FIG.48

| MOVABLE OPERATOR | 4 | 6 | 7 | 8 | 11 | 14 | 15 |
|---|---|---|---|---|---|---|---|
| ALLOCATION MARGIN POINT | | | | | | | 1 |
| ALLOCATION COMPLETION FLAG | 1 | 1 | 1 | 1 | 1 | 1 | 0 |
| ALLOCATION DESTINATION REFERENCE OPERATOR | 1 | 13 | 2 | 9 | 12 | 5/9 | 0 |
| CONCURRENTLY EXECUTABLE REFERENCE OPERATOR ID('S) FOLLOWED BY ALLOCATION FINALIZATION POINT AND ALLOCATION POINT | | | | | | | 1,0,1<br>2,0,1<br>3,1,1<br>5,0,1<br>12,0,1 |
| SELECTED REFERENCE OPERATOR WITH GREATEST ALLOCATION FINALIZATION POINT AND SMALLEST ALLOCATION POINT | | | | | | | 3,1,1 |

FIG.49

| MOVABLE OPERATOR | 4 | 6 | 7 | 8 | 11 | 14 | 15 |
|---|---|---|---|---|---|---|---|
| ALLOCATION MARGIN POINT | | | | | | | |
| ALLOCATION COMPLETION FLAG | 1 | 1 | 1 | 1 | 1 | 1 | 1 |
| ALLOCATION DESTINATION REFERENCE OPERATOR | 1 | 13 | 2 | 9 | 12 | 5/9 | 3 |
| CONCURRENTLY EXECUTABLE REFERENCE OPERATOR ID('S) FOLLOWED BY ALLOCATION FINALIZATION POINT AND ALLOCATION POINT | | | | | | | |
| SELECTED REFERENCE OPERATOR WITH GREATEST ALLOCATION FINALIZATION POINT AND SMALLEST ALLOCATION POINT | | | | | | | |

FIG.53A

| REFERENCE OPERATOR | ALLOCATED OPERATOR | ALLOCATABLE MOVABLE OPERATOR |
|---|---|---|
| 1 |  | 4 7    14 15 |
| 2 |  | 4 7 8 14 15 |
| 3 |  | 4 7 8 14 15 |
| 5 |  | 14 15 |
| 9 |  | 8 14 |
| 10 |  | 14 |
| 12 |  | 6 11  14 15 |
| 13 |  | 6 11 |

FIG.53B

| REFERENCE OPERATOR | ALLOCATED OPERATOR | ALLOCATABLE MOVABLE OPERATOR |
|---|---|---|
| 1 |  | 4 7      15 |
| 2 |  | 4 7 8  15 |
| 3 |  | 4 7 8  15 |
| 5 | 14 | 15 |
| 9 |  | 8 |
| 10 | 14 |  |
| 12 |  | 11  15 |
| 13 | 6 | 11 |

SCHEDULING METHOD FOR AUTOMATICALLY DEVELOPING HARDWARE PATTERNS FOR INTEGRATED CIRCUITS

This is a continuation of application Ser. No. 08/201,615 filed Feb. 24, 1994.

BACKGROUND OF THE INVENTION

The present invention generally relates to the art of scheduling and more particularly to the scheduling method employed for automatically developing a hardware pattern of integrated circuits (IC's) that form a processor. More specifically, the present invention relates to the automatic development of IC hardware in which a number of arithmetic units such as multipliers and adders are provided together with a control unit that controls each of the arithmetic units independently.

When designing an LSI (large-scale integrated circuit), particularly the LSI known as the ASIC (application specific integrated circuit) that carries out a specific predetermined program, the designer analyzes the input program or software algorithm and extracts (identifies) the control flow and data flow. The data flow describes the order of processing sequence of data and can be represented by a data flow graph shown in FIG. 1, wherein the flow of data is represented by a directed graph. In FIG. 1, the arrow represents the dependency while the capital letter represents the data. Further, the operator is represented by a circle. The small capital attached to the operator identifies the operator. As long as the operators have the same, common designation, these operators are the same operators.

The data flow as shown in FIG. 1 is analyzed such that the dependencies as shown in FIG. 1 between the operators are observed. When the sequence of behavior (control), that is, the sequence of operations and data transfers, has been determined, a scheduling result such as the one represented by a directed graph of FIG. 2 is obtained. As shown in the figure, a number is assigned to each control step, and the operators associated with the same control step are activated at the same time. The act of scheduling determines at which control step an operation or a data transfer specified in a behavior specification is executed.

A node in the directed graph of FIG. 2 indicates an operator, and the symbol associated with the node indicates the type of operation that is effected by the operator. An arrow indicates the dependency between operators. It will be noted in FIG. 2 that the operations b and c are executed after the execution of the operation a, and that the operations d is executed after the execution of the operations b and c. The dependencies between the operators obtained as a result of the scheduling are derived directly from the dependencies as shown in FIG. 1 between the operations in the input program. The scheduling is a process for allocating the operators to the control steps such that the dependencies as indicated in the directed graph are observed in determining the execution sequence of the operators.

If a scheduling is executed such that the number of operators is minimized over the entirety of the steps, the total number of required arithmetic units is minimized. The number of arithmetic units required for each control step is determined by the number of nodes. In the example of FIG. 2, the control step 1 requires one arithmetic unit, the control step 2 requires two arithmetic units, and the control step 3 requires one arithmetic unit. Hence, it is found that a maximum of two arithmetic units is required.

On the basis of the scheduling result as shown in FIG. 2, the type and number of the data bus components are determined as shown in FIG. 3. In other words, the scheduling result of FIG. 2 is translated into the allocation of arithmetic units, registers and memory devices as shown in FIG. 3.

It is desirable that a circuit having a minimum area and a high processing speed is synthesized based on the allocation result. In order to achieve this goal, a scheduling should be executed such that the total number of control steps is minimized, and such that the number of concurrent control steps (that is, the number of arithmetic units operating at the same time) is minimized over the entirety of the steps.

An art of "extracting parallelism" (described later in detail) in a program is introduced in order to achieve a high processing speed and an effective utilization of resources.

Conventionally, the extraction of parallelism in an input program including conditional branches has been independently carried out in each of the basic blocks that constitute the input program. For example, a statement including a conditional branch such as IF A THEN B ELSE C is conventionally scheduled such that the operators of the block B and those of the block C are independently subjected to scheduling. Until now it has been thought very difficult to perform an inter-block scheduling whereby parallelism is extracted across the blocks.

The conventional scheduling has the following characteristics.

The block structure in accordance with which the program has been written is faithfully observed. A branch testing is performed at the head of the branch, and operations are executed independently in accordance with the result of the testing. For example, in the case of a statement including a conditional branch such as IF A THEN B ELSE C, the scheduling is performed such that the operations of the block B and those of the block C are separately scheduled.

A description will now be given of the issues to be addressed by the art of extracting parallelism.

The extraction of parallelism, which is the key technology when scheduling a program run in a computer including a plurality of simultaneously operating arithmetic units, is a process for extracting operations that can be executed simultaneously. That is, it is a process for determining how a large number of arithmetic units (corresponding to operators) can best be utilized in a parallel manner. The requirements for operations that can be executed in a parallel manner are as follows.

① Operations that can be executed in a parallel manner do not share arithmetic units or data among each other.

② Operations that can be executed in a parallel manner do not require as input the result of any other operations.

The conventional art of extracting parallelism in a program including conditional branches has a drawback in that the extraction is not thorough enough. This is because there is no dependency between operators from blocks branching from the same node block.

Referring to an example of branches shown in FIG. 4, there is no dependency between B1 and B2 to which A branches, that is, either B1 or B2 can be executed first. Therefore, the conventional art of extracting parallelism, which art depends for its effectiveness upon the extraction of explicit dependency, can not extend beyond the branch nodes.

An inter-block extraction of parallelism has been difficult to achieve because it has to be responsible for various types of parallel processing.

Other requirements for the inter-block extraction of parallelism are that: it has to proceed under the condition that the result of extraction does not depend on which destination block a given block branches to; and that, if an operator originally belonging to a block like the block A or B is to be transferred to one of the branch blocks like the block B1, B2 . . . or Bn, an arrangement is necessary whereby that particular operator is to be activated in all of the branches, that is, the operation thereof should be executed whichever branch is chosen.

The objectives to be achieved by the scheduling include: automatic synthesis of a circuit having a high processing speed and a minimum area; synthesis of a circuit having a minimum number of arithmetic units (the requirement for the production of a chip having a minimum area can be met by allowing as many arithmetic units as possible to be shared so that the number of arithmetic units is minimized).

The number of required arithmetic units is equal to the maximum of the total number of arithmetic operations needed in each control step. Thus, when the number of operations required in a control step exceeds the number of operations in another control step, the number of arithmetic units required is determined by the greater of the number of operations. Accordingly, it is required not only that the overall processing speed is improved (the number of steps is minimized) but that the number of processes concurrently executed in each control step is minimized.

The specific drawbacks of the conventional art of scheduling will now be described.

In the conventional scheduling method, each basic block (explained later) is scheduled independently, that is, no scheduling is performed in which the operations within a branch are executed in advance of the branch testing. Hence, the arrangement of an input program into parallel processes can not be performed on an extensive scale. An imbalance is created between a block where a large amount of resources is required and a block where a smaller amount of resources is required. That is, there arise many instances where the resources that are needed in one basic block are not needed in another block, resulting in an inefficient use of chip area.

When the number of arithmetic operations required in one block exceeds the number of arithmetic operations required in another block, the number of arithmetic units is determined by the greater of the number of arithmetic operations. It is assumed in this type of scheduling that an operator in one block is activated only within that block, that is, only in concurrence with the other operators in that block. No measures is taken for relieving certain blocks of a large number of operations.

FIG. 5 shows an example of the result of the conventional scheduling, obtained when a program IF A THEN B1 ELSE B2; C; is scheduled. That is, the blocks A, B1, B2, C are independently (separately) scheduled. It will be noted from the figure that the number of arithmetic units required is five (see a step B21). It is obvious that there is a room for reducing the required area by reducing the number of arithmetic units.

Another scheduling which has the following characteristics is also proposed.

All the operations in the branches are executed, and only the correct results obtained through the branch operations are used. Since the branch operations are independent of each other, the resource used in the branch operations are shared within the blocks.

In this scheduling, since all the processes in the branch blocks are executed, unnecessary steps to execute unnecessary processes are performed, and unnecessary arithmetic units are needed.

SUMMARY OF THE INVENTION

The present invention has been developed in view of the above drawbacks and objectives, and its object is to provide a scheduling method in which the most time-consuming portion of an input program can be extracted and an estimation of the processing time can be made, by which those program portions that can be executed in a parallel manner can be extracted irrespective of the program structure, and by which the circuit synthesized by a synthesizer achieves a high-speed processing.

In order to achieve the above-identified object, the present invention provides a method for obtaining a hardware pattern of a microprocessor based upon a program that is processed by the microprocessor, the microprocessor including a plurality of arithmetic units and a control unit that controls the plurality of arithmetic units independently, the method comprising the steps of:

extracting a plurality of traces from a given program such that each of the plurality of traces contains a plurality of program blocks executed sequentially, each of the plurality of program blocks containing one or more operators to be executed by the arithmetic units and being separated from another program block in the trace by a branching step for causing a branching to or from a program block outside of the trace;

extracting, in each of the plurality of traces, a critical path of the operation conducted by the operators in the trace, the critical path being formed of a plurality of reference operators, the rest of the operators forming movable operators that are conducted concurrently with one or more of the reference operators;

scheduling, in each of the traces, the processing steps of the movable operators such that the maximum of the number of the movable operators conducted concurrently to a reference operator in a given trace, is minimized.

The present invention also provides a method, wherein the step of scheduling comprises the steps of: obtaining the number of the movable operators conducted concurrently to a reference operator for each of the reference operators and for each possible combination of the movable operators and the reference operators; and selecting the combination wherein the maximum of the number of the movable operators conducted concurrently to a reference operator is minimized.

The present invention also provides a method, wherein the step of scheduling comprises the step of allocating the movable operators to a reference operator in which the number of the possible movable operators allocatable thereto is minimum.

The present invention also provides a method, wherein the step of scheduling comprises the step of allocating the movable operators to a reference operator in which the number of the movable operators already allocated thereto is minimum.

The present invention also provides a method, wherein the step of allocating the movable operators comprises the steps of: identifying a maximum reference operator having the maximum number of allocated movable operators in the trace; and allocating a movable operator to a selected reference operator in the trace such that the difference in the number of allocated movable operators between the maximum reference operator and the selected reference operator, becomes maximum.

The present invention also provides a method, wherein the step of scheduling comprises the step of allocating the movable operators to a reference operator, starting from the movable operator that has the smallest degree of freedom of scheduling.

The present invention also provides a method, wherein the method further comprises a step of copying a movable operator in a block included in a trace to another block included in another trace.

The present invention also provides a method for scheduling jobs to be executed, comprising the steps of:

extracting a plurality of traces from a given stream of jobs such that each of the plurality of traces contains a plurality of blocks executed sequentially, each of the plurality of blocks containing one or more operations and being separated from another block in the trace by a branching step for causing a branching to or from a block outside of the trace;

extracting, in each of the plurality of traces, a critical path of the operations conducted in the trace, the critical path being formed of a plurality of reference operations, the rest of the operations forming movable operations that are conducted concurrently with one or more of the reference operations;

scheduling, in each of the traces, the processing steps of the movable operations such that the maximum of the number of the movable operations conducted concurrently to a reference operation in a given trace, is minimized.

BRIEF DESCRIPTION OF THE DRAWINGS

Other objects and further features of the present invention will be apparent from the following detailed description when read in conjunction with the accompanying drawings, in which:

FIG. 8 shows an example of conventional input program;

FIG. 11 shows the dependencies of operators of FIG. 9;

FIG. 12 shows the correspondences between operators and blocks of FIG. 9;

FIG. 13 shows the block flow relationship of FIG. 9;

FIG. 17 shows the dependencies between operators of FIG. 16;

FIG. 18 shows a list of the dependent operators of FIG. 16;

FIG. 19 shows a list of the operators of FIG. 16 which are depended on;

FIG. 20 shows a list of all the dependent operators on the dependency chains of FIG. 16;

FIG. 21 shows a list of all the operators depended on the dependency chains of FIG. 16;

FIG. 26 shows the mobility table of the second block group;

FIG. 27 shows the mobility table of the first block group;

FIG. 29 shows the global-level mobility table of FIG. 9;

FIG. 30 shows the result of extracting mobility of the operators of FIG. 9;

FIG. 32 shows an inter-block mobility table of FIG. 9;

FIG. 34 shows a reference operator table (part 1) derived from FIG. 9;

FIG. 35 shows a reference operator table (part 2) derived from FIG. 9;

FIG. 36 shows a reference operator table (part 3) derived from FIG. 9;

FIG. 37 shows a reference operator table (part 4) derived from FIG. 9;

FIG. 38 shows a reference operator table (part 5) derived from FIG. 9;

FIG. 39 shows a reference operator table (part 6) derived from FIG. 9;

FIG. 40 shows a reference operator table (part 7) derived from FIG. 9;

FIG. 41 shows a reference operator table (part 8) derived from FIG. 9;

FIG. 42 shows a movable operator table (part 1) derived from FIG. 9;

FIG. 43 shows a movable operator table (part 2) derived from FIG. 9;

FIG. 44 shows a movable operator table (part 3) derived from FIG. 9;

FIG. 45 shows a movable operator table (part 4) derived from FIG. 9;

FIG. 46 shows a movable operator table (part 5) derived from FIG. 9;

FIG. 47 shows a movable operator table (part 6) derived from FIG. 9;

FIG. 48 shows a movable operator table (part 7) derived from FIG. 9;

FIG. 49 shows a movable operator table (part 8) derived from FIG. 9;

FIG. 53A shows a representation table;

FIG. 53B shows an interim scheduling result; and

DETAILED DESCRIPTION OF THE EMBODIMENTS

Figure 6:
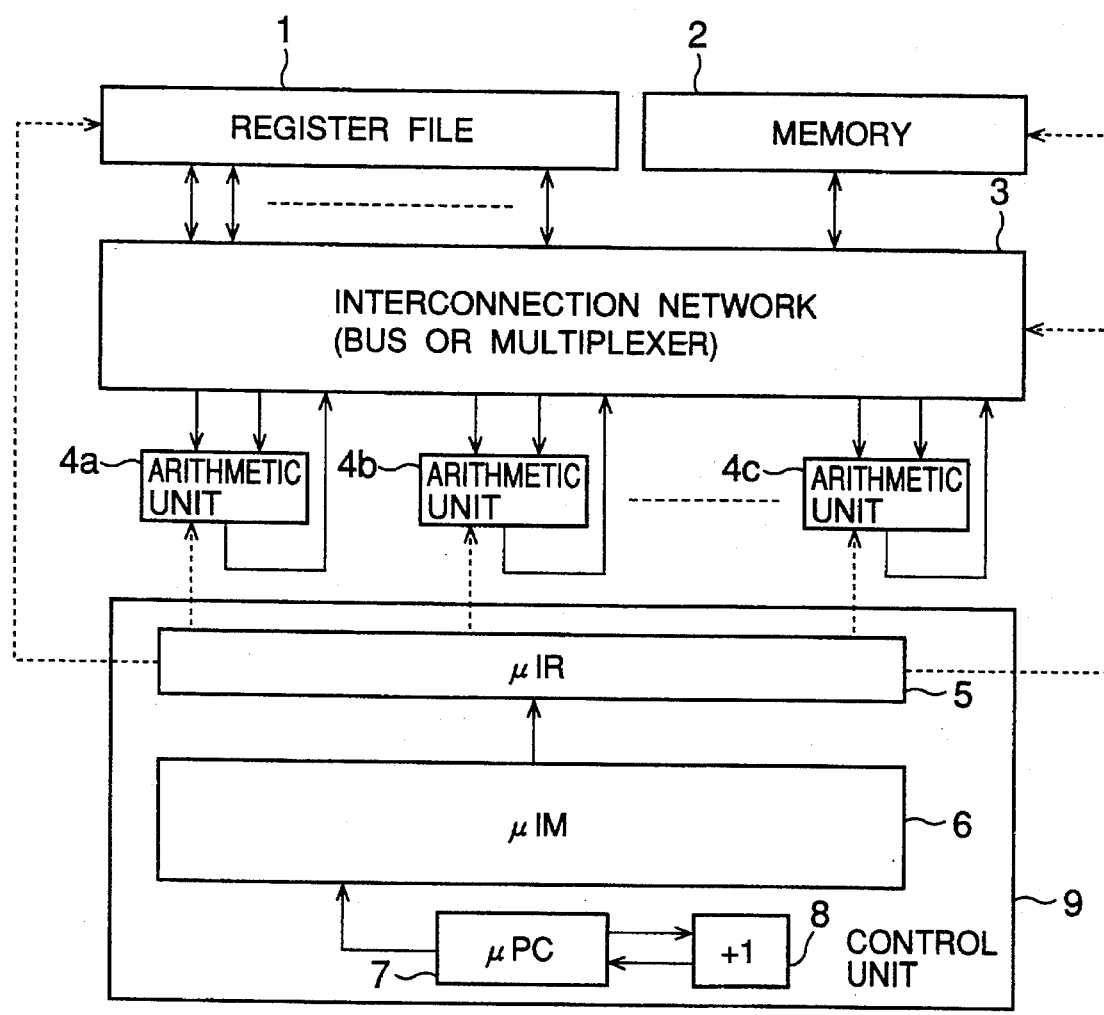
FIG. 6 shows an example of architecture employed in a circuit to be synthesized, provided to explain an embodiment of the scheduling method of the present invention.

FIG. 6 shows an example of architecture employed in a circuit to be synthesized, provided to explain an embodiment of the scheduling method of the present invention. In the architecture of FIG. 6, there are provided a set of registers 1, a memory part 2, a interconnection network part 3, arithmetic units 4a–4c, a microinstruction register (μIR) 5, a microinstruction memory (μIM) 6, a microprogram counter (μPC) 7, an adder 8, and a control unit 9.

The present invention relates to a scheduling method employed to automatically generate a program run on a computer having the architecture as shown in FIG. 6, and to a method of automatically producing a circuit having such an architecture. It is to be noted that FIG. 6 is a block diagram of a computer having the VLIW (very long instruction words) architecture.

VLIW is a generic term describing an architecture capable of controlling a large number of operating units independently. Referring to FIG. 6, the set of registers 1, the arithmetic units 4a–4c, the interconnection network part 3, the control unit 9, and the memory part 2 constitute the VLIW architecture. There is provided one control system for taking one instruction (long instruction) in each cycle time and one instruction counter. An instruction is constructed of a plurality of operations. The numbers of data paths and arithmetic units are sufficient for the execution of operations, each operation being executable in cycles predictable at the time of compiling.

The control system is a part for generating a control signal for activating hardware resources on a data path in accordance with a predetermined order determined as a result of a scheduling. The control system is composed of a part for specifying how processes are executed in each control step, a decoder for supplying a control signal to a data path, and a signal line.

Either a control using microprogramming codes or a control using hard-wired logic may be employed. The constitution of FIG. 6 employs the control using microprogramming codes and the control unit of this type is called a horizontal parallel microsequence controller.

Figure 7:
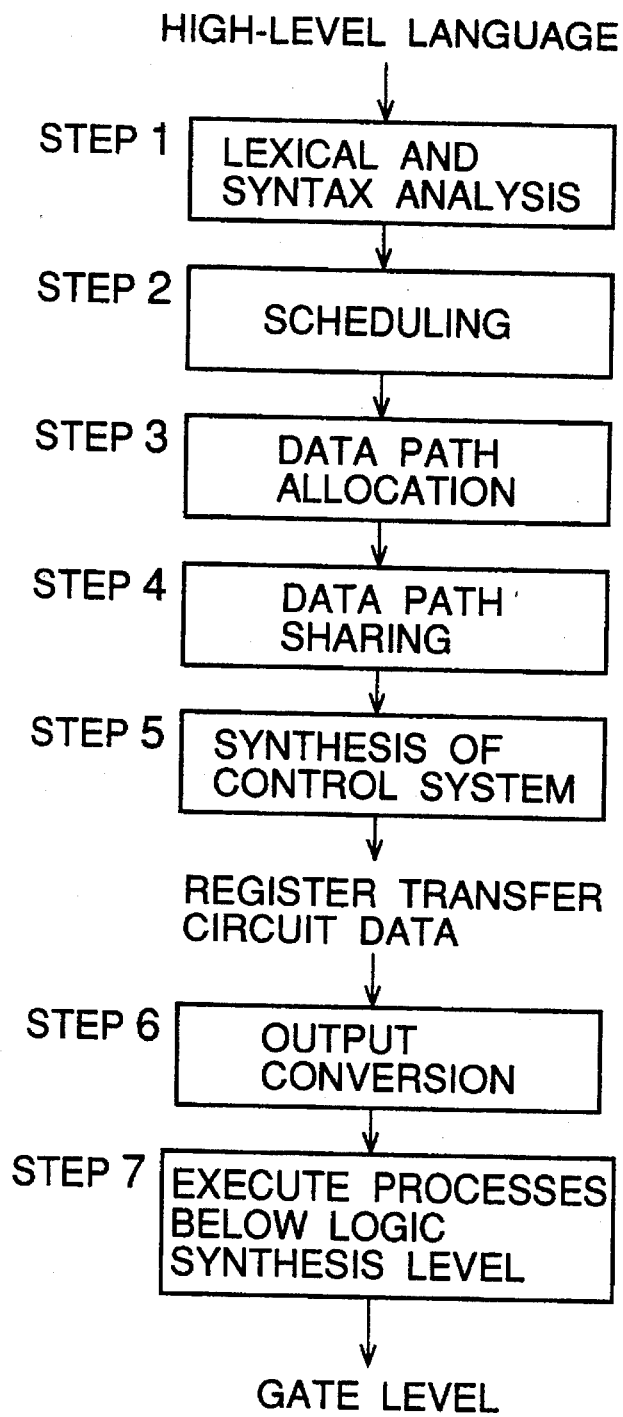
FIG. 7 shows how the conventional automatic circuit synthesis is generally carried out.

A description will now be given of a general outline of how a circuit is automatically synthesized. FIG. 7 shows the flow of a synthesis which comprises the following processes.

step 1

Input program (processing procedure) is analyzed.

Figure 1:
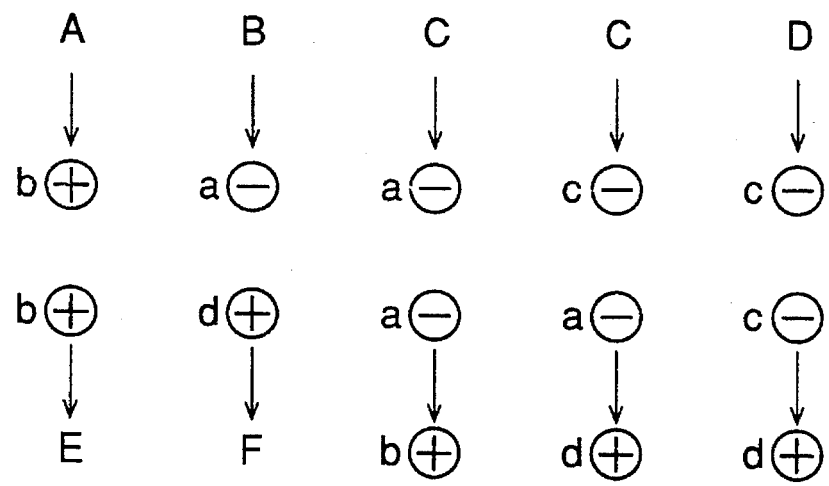
FIG. 1 shows an example of dependencies between operators.

Lexical and syntax analysis is conducted so that dependencies between processes in the program (see FIG. 1) can be extracted.

step 2

Figure 2:
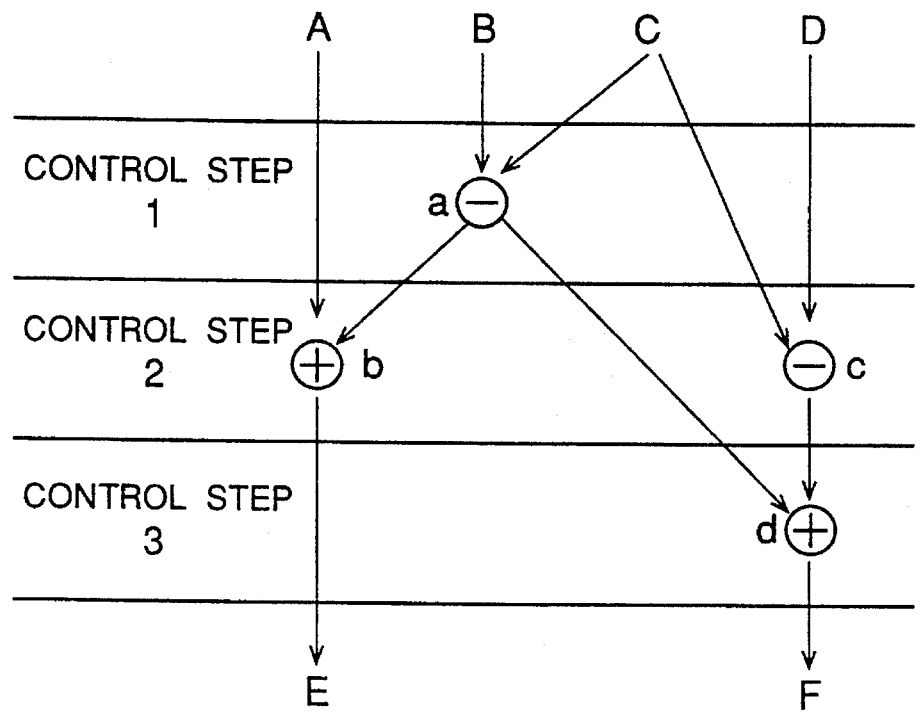
FIG. 2 shows an example of data flow graph.

The scheduling is performed (see FIG. 2).

The priority of the executions of the operations and data transfers specified in the behavior specification is determined such that the dependencies between processes are observed.

step 3,4

Figure 3:
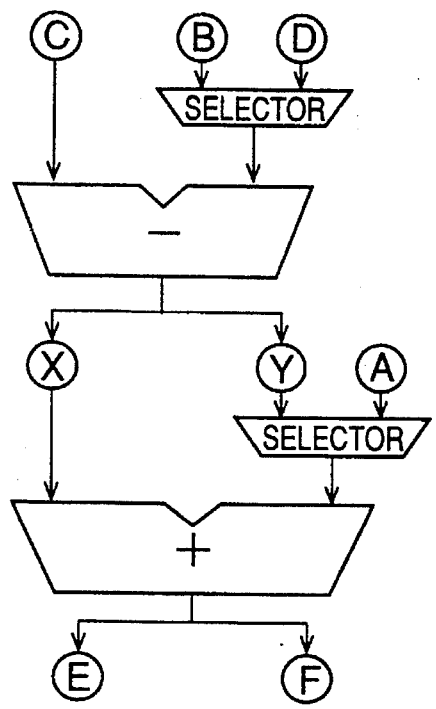
FIG. 3 shows an example of conventional allocation result.

Data paths are allocated (see FIG. 3).

The type and number of data path components are determined and components are allocated to the processes. This task involves:

1 Allocation of operators

2 Allocation of storage elements including registers and memories

3 Allocation of interconnecting elements including buses and multiplexors step 5

The control circuit is synthesized step 6, 7

The output conversion is performed and the synthesizing processes below the logic synthesis level are performed.

A basic idea of the relationship between the scheduling result and the synthesized circuit is given by referring to FIGS. 2 and 3, where the scheduling result of FIG. 2 is transformed into the allocation shown in FIG. 3.

Figure 4:
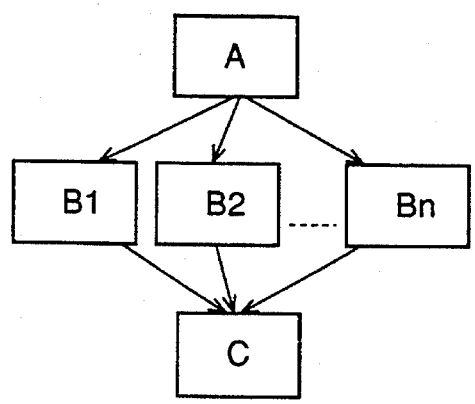
FIG. 4 shows an example of block flow relationship.

A description will now be given of blocks and basic blocks, with reference to FIG. 4 showing typical branches. Each of the process modules A, B1, B2 . . . Bn, and C is called a basic block, which branches to another process module only at the last statement. By definition, a basic block is a block which does not consume the output of any other processes in the middle of the block (sequence of processes), and which is open only at the beginning and the end thereof.

A description will now be given of a measure called copying.

When an operator originally belonging to a block outside the branches is to be transferred to any of the branches, it is necessary that the operator is executed in all of the branch blocks. Otherwise, that particular operator will not be activated when the branch in which it is not disposed is chosen. The extraction of parallelism not taking this into account will not be complete. For this reason, certain operators need to be arranged so that they are executed in a plurality of positions. This arrangement or measure is called copying.

Figure 9:
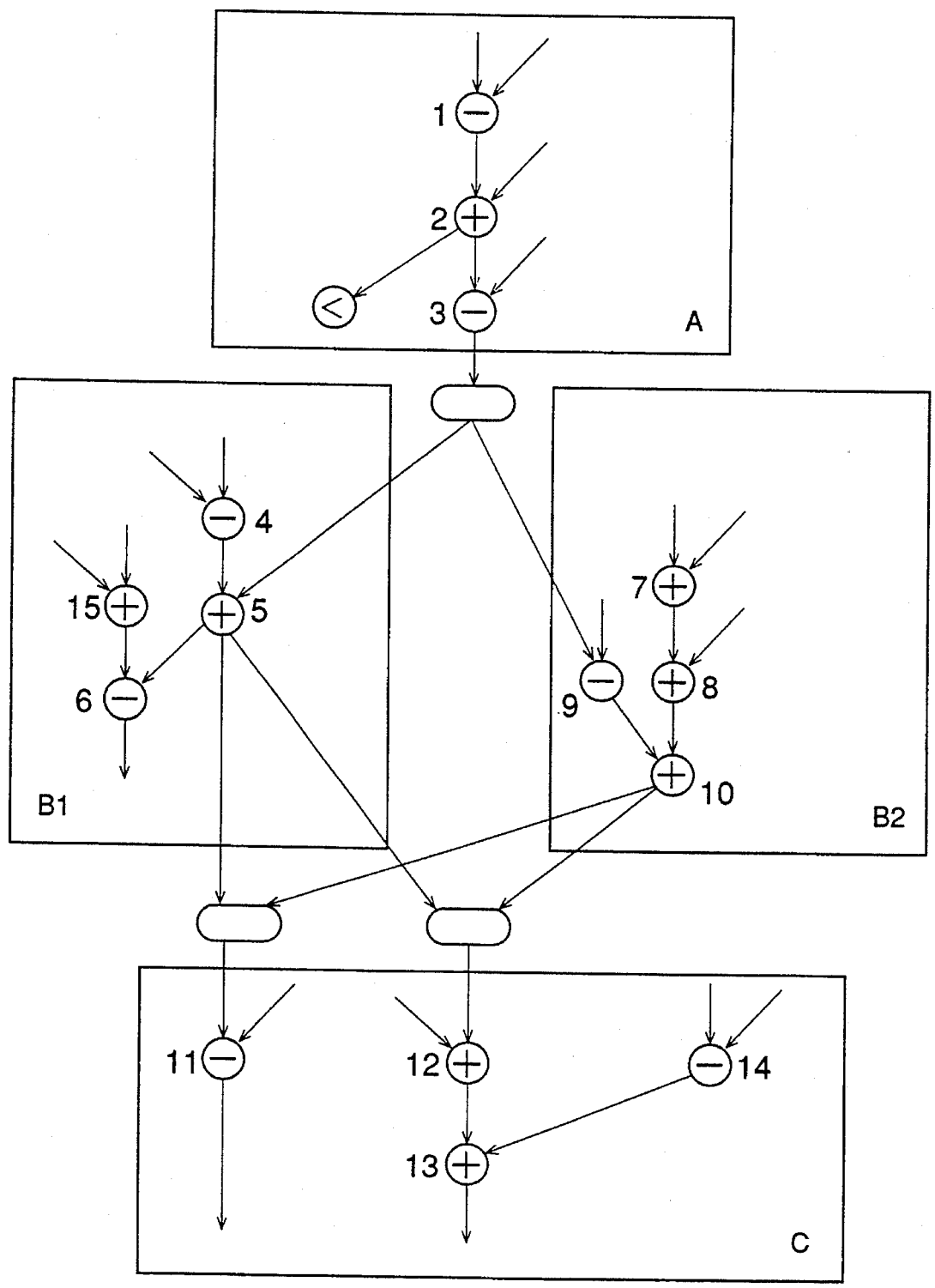
FIG. 9 shows an example of relationship between operators.

FIG. 8 shows a sample input program, and FIG. 9 shows a data flow graph corresponding to the input program of FIG. 8.

Referring to FIG. 9, only one of blocks B1 and B2 is executed at a time. An operator 14 which is expected to be activated in a block C may also be activated in concurrence with the activation of the operators on the critical path (the processing route requiring the greatest number of steps) within the block B1 or of the operators on the critical path within the block B2. When it is arranged that the operator 14 is activated in concurrence with only one of the two blocks, the operator 14 will not be activated if, as a result of a conditional branch, the block to which the operator 14 is tied is not executed. Hence, the extraction of parallelism must take into account of the fact that the operator 14 must be "copied" to both the B1 block and the B2 block.

A description will now be given of the extraction of parallelism in conditional branches.

The scheduling method of the present invention is applied to the automatic generation of a program to be run on a computer having an architecture as shown in FIG. 6 or to the automatic synthesis of a circuit having such an architecture. The scheduling method of the present invention is a method for extracting parallelism in a program containing branches by dividing the program into parts where the dependencies between operators are explicit (that is, where there are not any branches) before the extraction is conducted, and by integrating the results of extraction.

Figure 10:
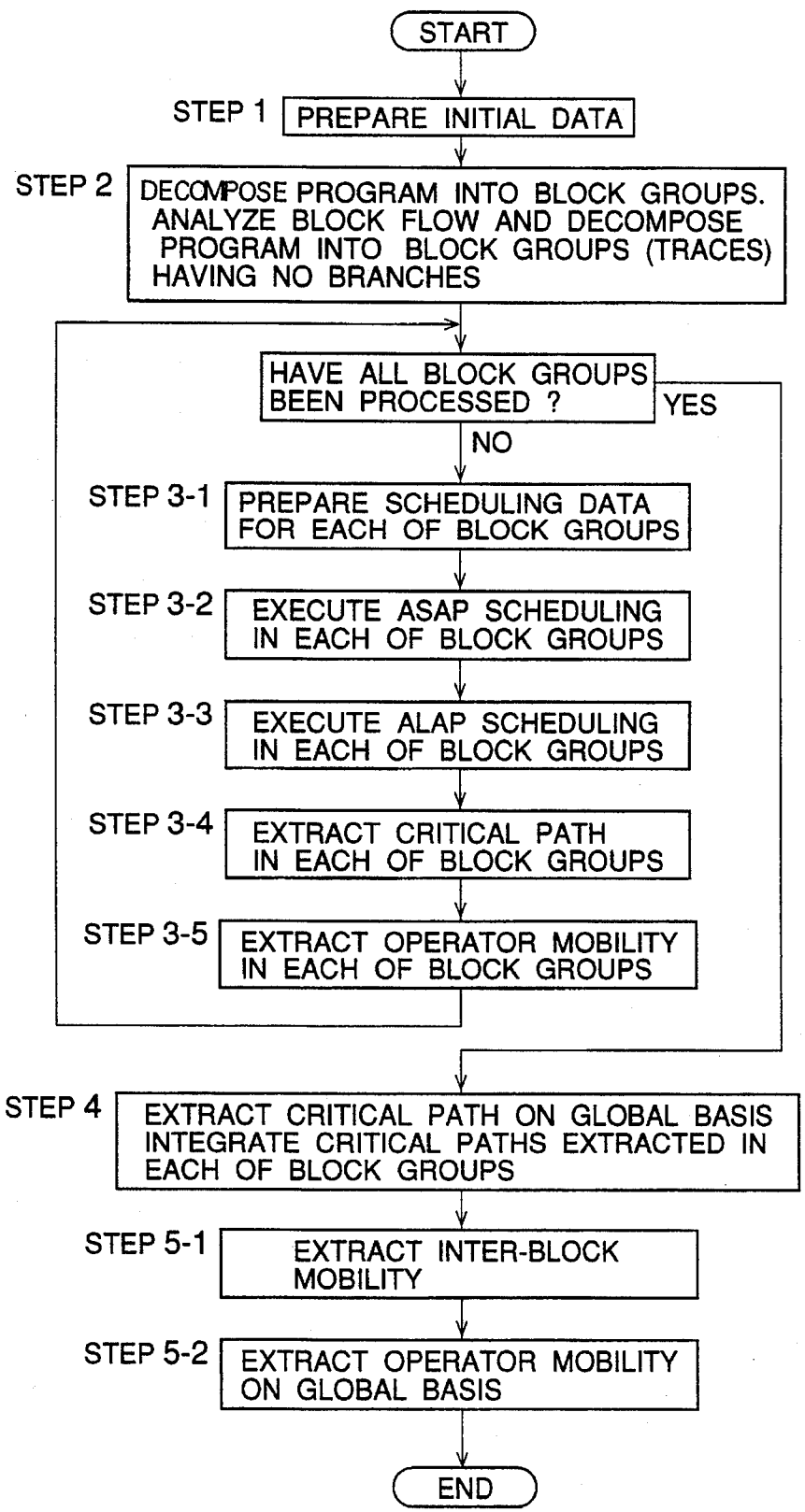
FIG. 10 shows a parallelism extraction algorithm employed in the scheduling method of the present invention.

FIG. 10 shows an algorithm for extracting parallelism in a program containing conditional branches. This algorithm generally comprises the following steps which will be described later in detail.

step 1
Prepare initial data
step 2
Decompose an input program into block groups.
The block flow relationship is analyzed and the program is decomposed into block groups (occasionally referred to as traces in this specification) containing no branches.
step 3-1
Prepare scheduling data for each of the block groups.
step 3-2
Execute an ASAP (as soon as possible) scheduling in each of the block groups.
step 3-3
Execute an ALAP (as late as possible) scheduling in each of the block groups.
step 3-4
Extract the critical path (the processing route requiring the greatest number of steps) in each of the block groups.
step 3-5
Extract the mobility in each of the block groups.
step 4
Extract the global-level critical path.
Integrate the critical paths extracted in each of the block groups.
step 5
Extract the global-level mobility of the operators.
The mobility of an operator is denoted as a series of operator ID's on the critical path on which the operator can be executed. Thus, the operators on the critical path extracted as a result of the step 4 are left out of the following steps.
step 5-1
Extract the inter-block mobility.
The range that an operator can be moved beyond nodes is extracted. This task is performed in the block to which the operator belongs such that movements accompanying the copying and those not accompanying the copying are discriminated.
step 5-2
Extract the global-level mobility of the operators.
The mobility of each of the operators is determined by integrating the results of the step 3 where the mobility of the operators is determined in each of the block groups. When the copying of an operator is involved, a set of locations to which the operator is copied is extracted.

The following is a detailed description of the above-mentioned steps 1–5.
step 1
Preparation of initial data
The input software algorithm (program) is analyzed so as to prepare the following three kinds of data.
① Correspondences between operator ID (identification) numbers, operator type ID's (identification), and block ID's.
② Dependencies between the operators.
③ Block flow relationship FIG. 11 is an example of the data listed in the item ② above, and registers the dependencies between the operators shown in the directed graph of FIG. 9. It is to be noted that dependencies across the blocks are also registered.

FIG. 12 is an example of the data listed in the item ① above, that is, the correspondences between the operator ID numbers, the operator type ID's, and the block ID's. In other words, it contains the data showing the correspondences between the operators and the blocks in which they are provided.

FIG. 13 is an example of the data listed in the item ③ above, that is, the block flow relationship. It will be learned from FIGS. 12 and 13 that this program is of a IF A THEN B1 ELSE B2; C type, wherein the block A includes the operators 1, 2 and 3; the block B1 includes the operators 4, 5, 6 and 15; the block B2 includes the operators 7, 8, 9 and 10; and the block C includes the operators 11, 12, 13 and 14.

step 2
Decomposition of the program into block groups
The block flow relationship is analyzed as indicated in the item ③ above, so that the program is decomposed into block groups (traces) having no branches.

Figure 14A:
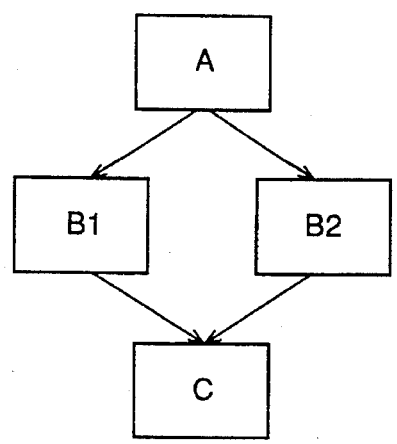
FIG. 14A is an illustration of the block flow relationship of FIG. 9.
Figure 14B:
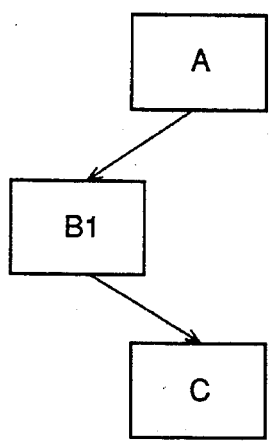
FIG. 14B shows a first block group of FIG. 9.
Figure 14C:
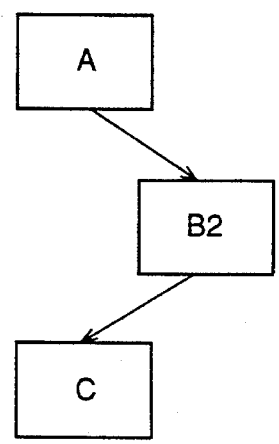
FIG. 14C shows a second block group of FIG. 9.

FIGS. 14B and 14C show the traces obtained from a sample block flow relationship of FIG. 14A. A trace is a long sequence of instructions (operations) which are autonomously executed, and is obtained by discarding commands for instructing a branch, at each of the branch nodes.

Traces are extracted by identifying the dependencies between blocks, and by finding out all the possible processing routes from the beginning to the end of the program.

Figure 15:
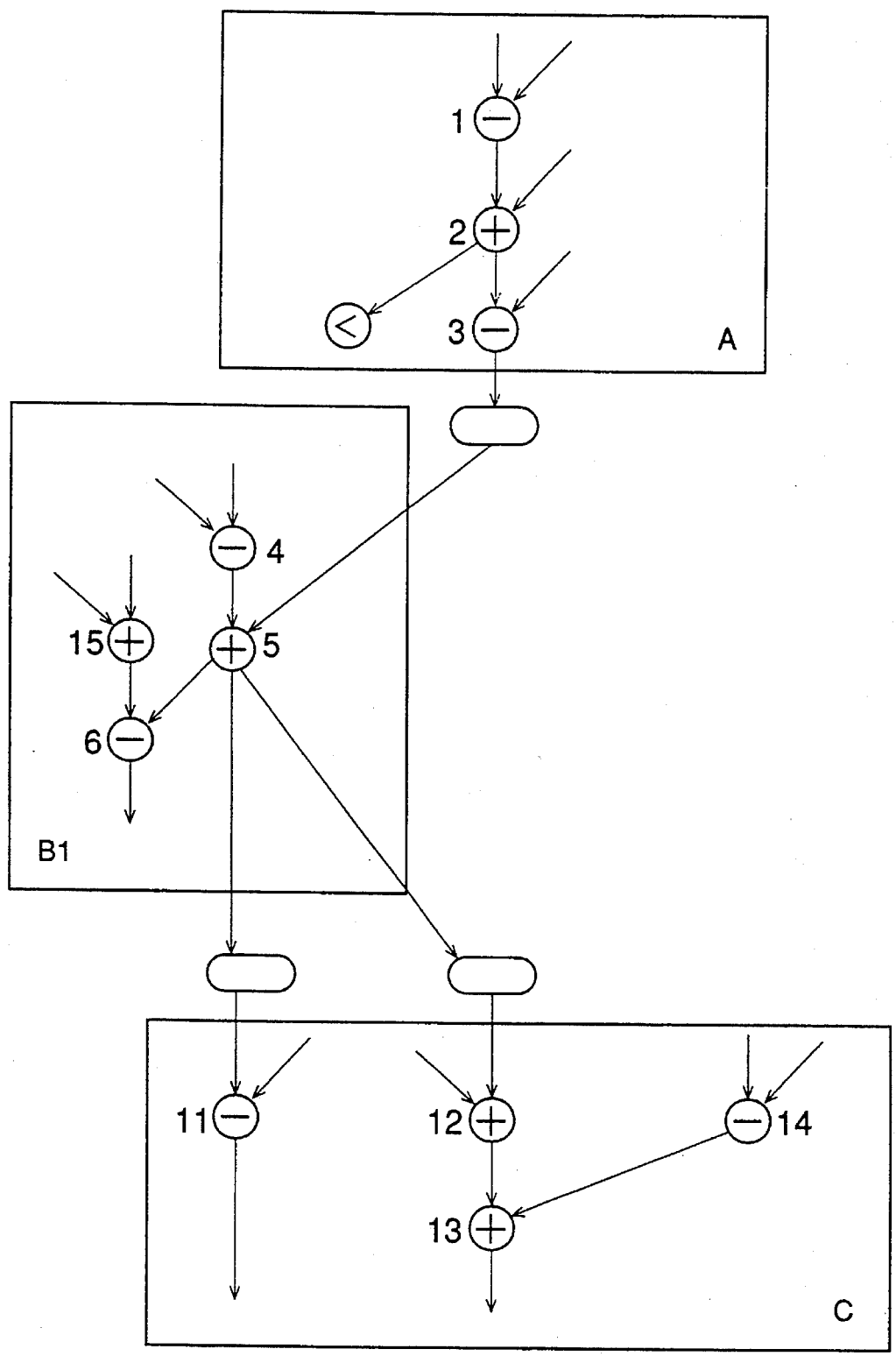
FIG. 15 is an illustration of the first block group of FIG. 9.
Figure 16:
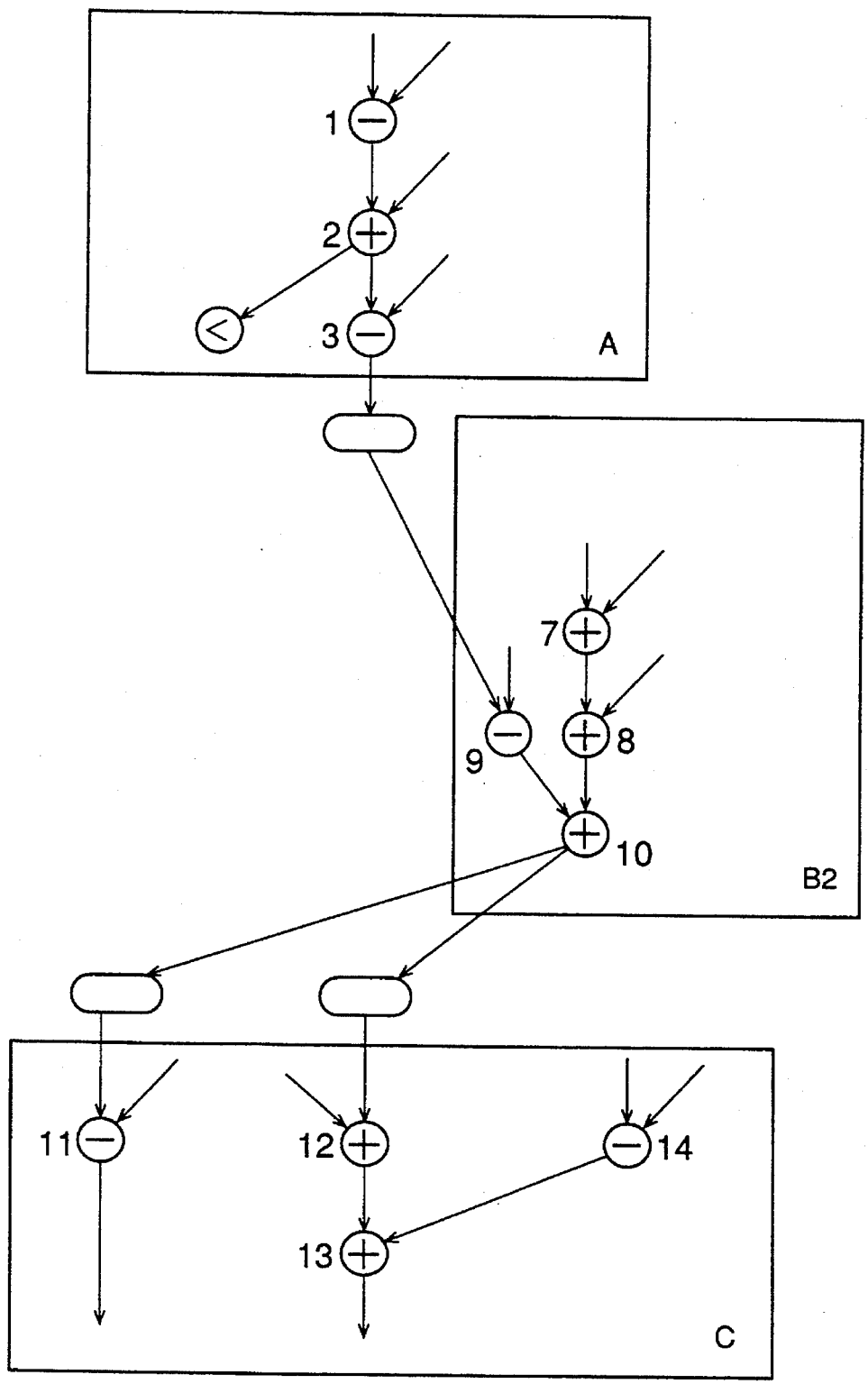
FIG. 16 is an illustration of the second block group of FIG. 9.

FIGS. 15 and 16 are the block groups obtained as a result of decomposing the entirety of the blocks shown in FIG. 9. Once the dependencies between the operators are explicitly shown by discarding the branches, each of the block groups (i.e., the block group of FIG. 15 and the block group of FIG. 16) are subjected to the subsequent parallelism extraction processes.

Here, the block group of FIG. 16 is taken as an example.
step 3-1
Preparation of scheduling data
FIG. 17 is the data indicating the dependencies between the operators shown in the directed graph of FIG. 16. This data is used as the input data in the scheduling. The scheduling also uses FIGS. 8 and 9 indicating the relationship, in terms of dependency, between each of the operators and the immediately preceding/following one, as well as FIGS. 20 and 21 which enumerate the chains of dependency.
step 3-2
ASAP scheduling
In an ASAP (as soon as possible) scheduling, the operations are scheduled so that they are executed at an earliest possible stage.

Figure 22:
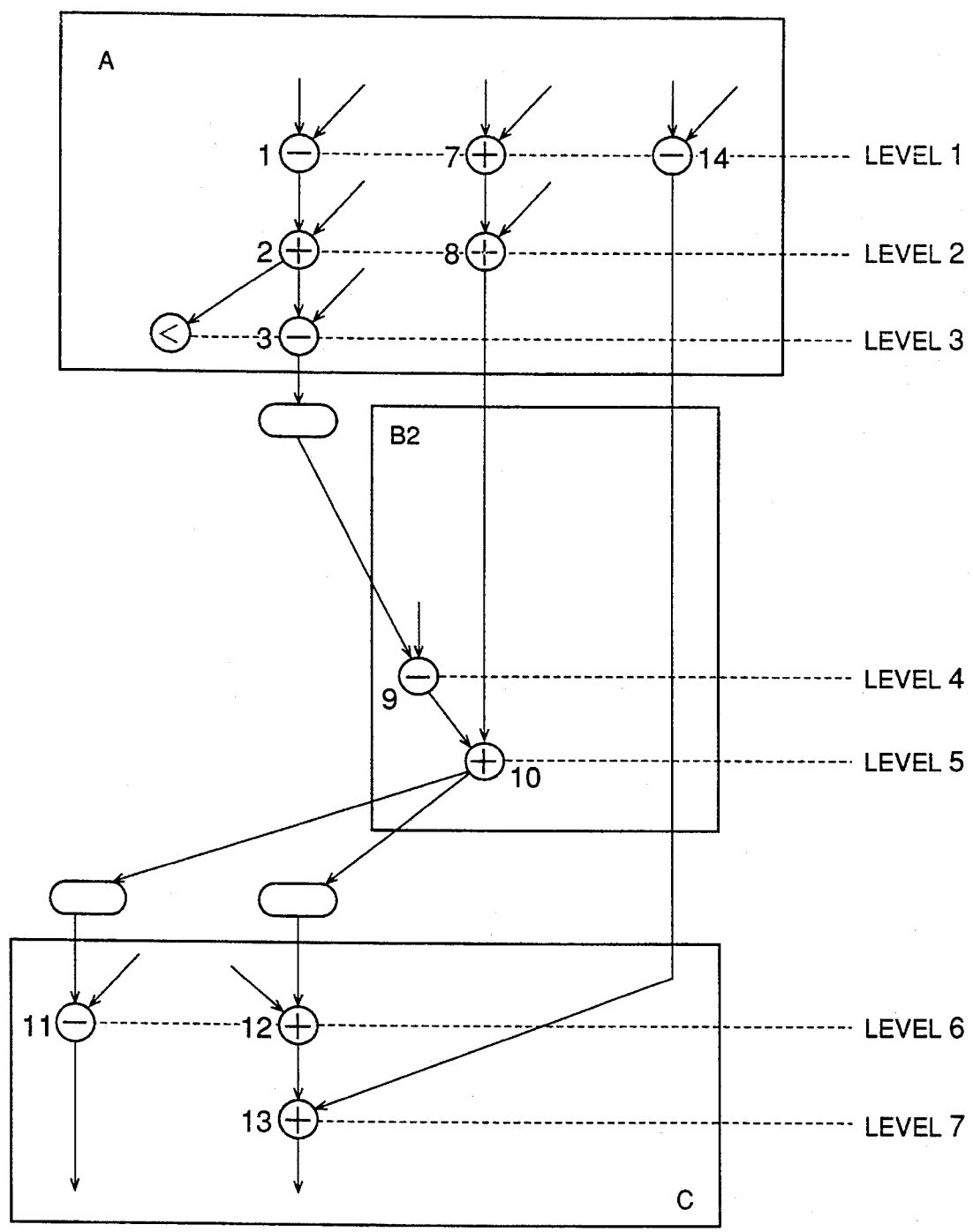
FIG. 22 shows the ASAP scheduling result.

When the data flow indicated in FIG. 17 is given as input, the scheduling result shown in FIG. 22 is obtained.

Specifically, the ASAP scheduling is conducted as follows.

(1) Set the initial "level" (see FIGS. 22 and 23) of all the operators at 0.

(2) Refer to FIG. 19 so as to determine those operators which are not dependent on any other operators. For example, it is found from FIG. 19 that the operator 1 does not depend on any other operators.

(3) Set the level of those non-dependent operators at 1. For example, the operator 1 is assigned to level 1.

(4) Refer to FIG. 18 so as to identify the operators dependent on the non-dependent operators. For example, it is found from FIG. 18 that the operator 2 is dependent on the operator 1.

(5) If the level of an operator identified as the dependent operator is equal to or smaller than the level of the non-dependent operator which it is tied to, the level of that dependent operator is incremented so as to be greater than the level of that non-dependent operator by one. For example, since the initial level of the operator 2 is 0, which is smaller than the level of the operator 1, the operator 2 is assigned to "level 2" (1+1=2).

(6) Set the level of the operators dependent on the operator whose level is set in the step (5) above by referring to FIG. 18 again. For example, FIG. 18 also tells us that the operator 3 is dependent on the operator 2. The same rule as the one applied to the above step (5) is applied here. That is, the operator 3 is assigned to level 3 (2+1=3). This process is continued until there is no dependent operator to be assigned.

(7) The steps (4)–(6) are repeated for the other non-dependent operators (the operators 7 and 14 in this example). However, it is to be noted that the assignment chain beginning with one non-dependent operator and that beginning with another non-dependent operator may yield different results. For example, the operator 10 will be assigned to level 5 along the assignment chain beginning with the operator 1, while it will be assigned to level 3 along the assignment chain beginning with the operator 7. In such a case, the greater of the level numbers must be employed (in this case, the operator 10 is assigned to level 5).

step 3-3
ALAP scheduling

In an ALAP (as late as possible) scheduling, the operations are scheduled so that they are executed at a latest possible stage. In ALAP scheduling as well as in ASAP scheduling, the dependencies between the relevant operators are observed.

Figure 23:
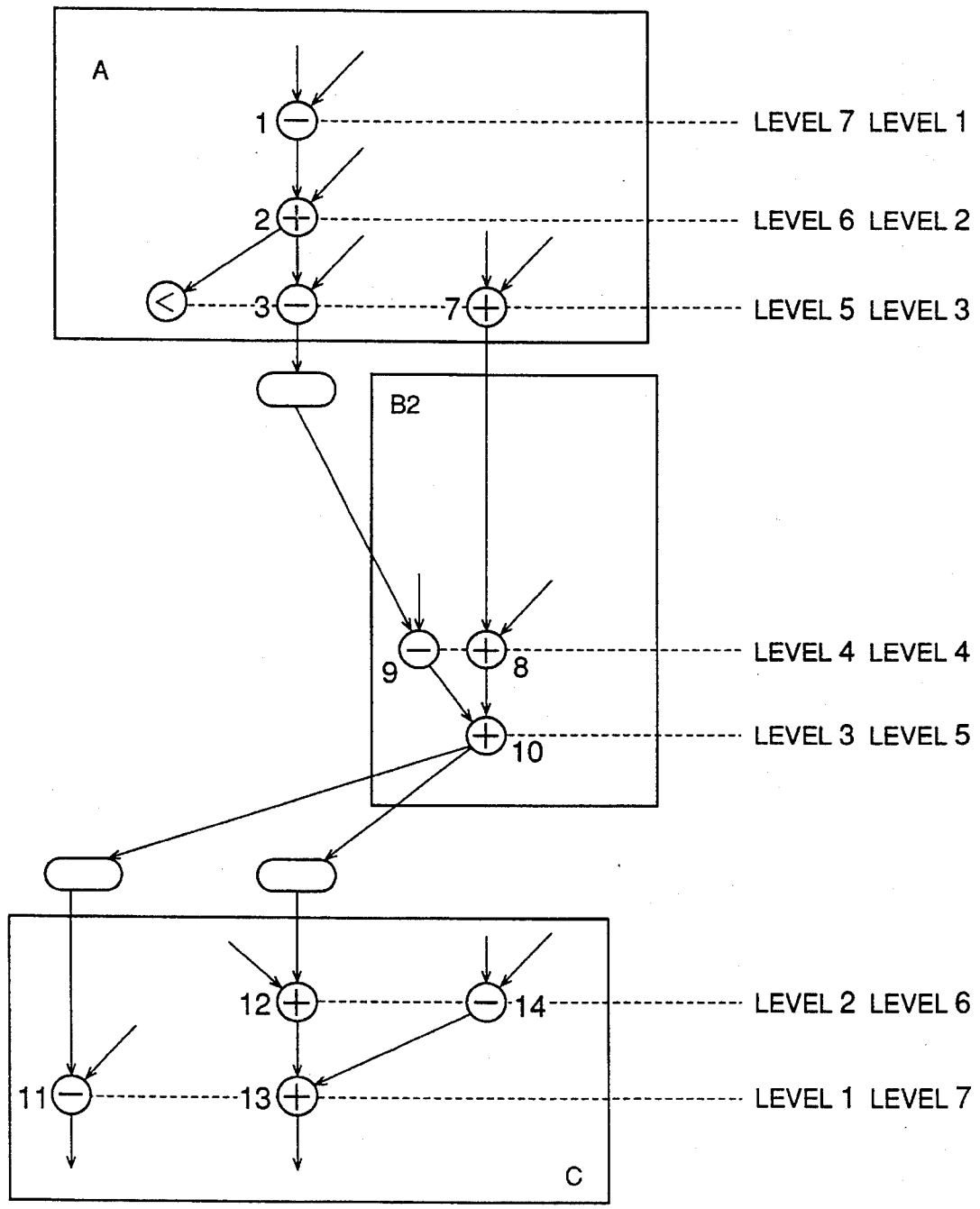
FIG. 23 shows the ALAP scheduling result.

When the data flow indicated in FIG. 17 is given as input, the scheduling result shown in FIG. 23 is obtained.

Specifically, the ALAP scheduling is conducted as follows.

(1) Set the initial level of all the operators at 0.

(2) Refer to FIG. 18 so as to identify the operators which are not depended on by any other operators. For example, it is found from FIG. 18 that the operator 13 is not depended on by any other operators. For convenience's sake, these operators shall be referred to as closed-end operators.

(3) Temporarily set the level of the closed-end operators at 1.

(4) Refer to FIG. 19 so as to identify the operators on which the closed-end operators depend. For example, it is found from FIG. 19 that the closed-end operator 13 depends on the operators 12 and 14.

(5) If the level of an operator identified as the operator on which the closed-end operator depends is equal to or smaller than the level of the closed-end operator, the level of that operator is temporarily incremented so as to be greater than the level of the closed-end operator by one. For example, since the initial level of the operators 12 and 14 is 0, which is smaller than the level of the operator 13, the operators 12 and 14 are temporarily assigned to "level 2" (1+1=2).

(6) Temporarily set the level of the operators on which the operator whose level is temporarily set in the step (5) above by referring to FIG. 19 again. For example, FIG. 19 also tells us that the operator 10 is depended on by the operator 12. The same rule as the one applied to the above step (5) is applied here. That is, the operator 10 is temporarily assigned to level 3 (2+1=3). This process is continued until there is no operator to be assigned along an assignment chain.

(7) The steps (4)–(6) are repeated for the other closed-end operators (the operator 13 in this example). However, it is to be noted that the assignment chain beginning with one closed-end operator and that beginning with another closed-end operator may yield different results. For example, the operator 10 will be assigned to level 2 along the assignment chain beginning with the operator 11, while it will be assigned to level 3 along the assignment chain beginning with the operator 13. In such a case, the greater of the level numbers must be employed (in this case, the operator 10 is temporarily assigned to level 3).

(8) Reverse the arrangement of the level numbers, that is, the operators that are assigned to the greatest level number as a result of the above steps (4)–(6) are reassigned to the smallest level number, and the operators that are assigned to the smallest level number as a result of the above steps (4)–(6) are reassigned to the greatest level number (see the right side of FIG. 23).

This gives the final result of the ALAP scheduling.

step 3-4
Extraction of a critical path

Figure 24:
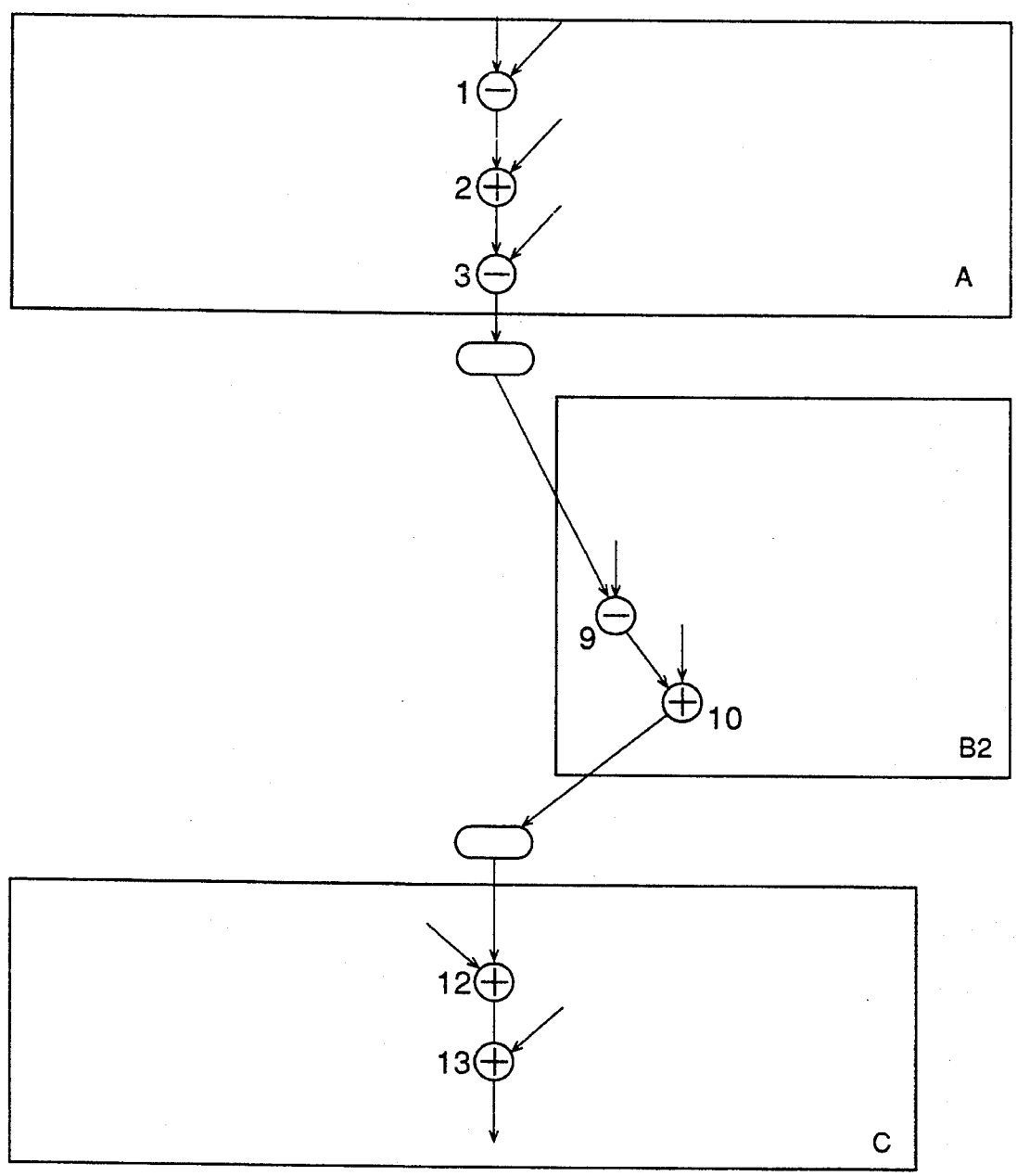
FIG. 24 shows the critical path of the second block group.

The ASAP scheduling result and the ALAP scheduling result are compared. It is determined that those operators that are assigned to the same level are on the critical path since they will never be moved to any other level. FIG. 24 shows the critical path obtained for the block group shown in FIG. 16. For reference, there is also provided FIG. 25, which shows the critical path obtained for the block group shown in FIG. 15.

step 3-5
Extraction of the mobility.

FIG. 26 is a mobility table obtained as a result of performing the aforementioned steps in the block group shown in FIG. 16. In this table, the reference operators on the critical path are listed in the column on the left, the movable operators which may be assigned to one or some of a plurality of control steps are listed in the row on the top.

For example, FIG. 26 tells us that the execution of the operator 7 may concur with the execution of the operator 1, the operator 2 or the operator 3. As shown in the figure, the operator 7 has a mobility in relation to the reference operators 1, 2 and 3.

It is determined that an operator assigned to different levels in the ASAP scheduling and in the ALAP scheduling has a mobility, that is, it may be allocated to anywhere within a range marked by its level in the ASAP scheduling result at one end, and by its level in the ALAP scheduling result at the other end.

For reference, there is also provided FIG. 27, which is a mobility table obtained as a result of performing the aforementioned steps in the block group shown in FIG. 15.

step 4
Extraction of the global-level critical path

Figure 25:
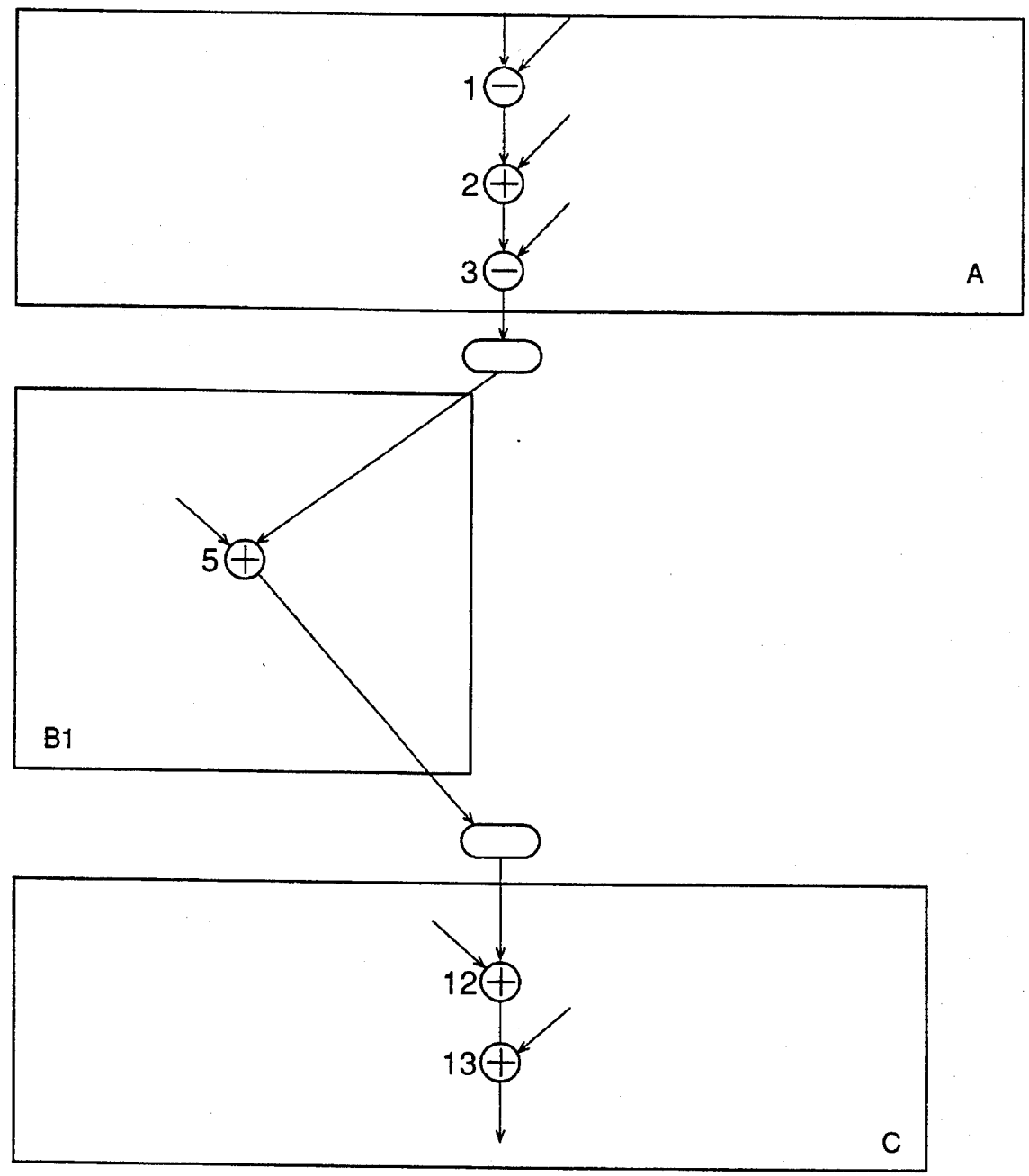
FIG. 25 shows the critical path of the first block group.
Figure 28:
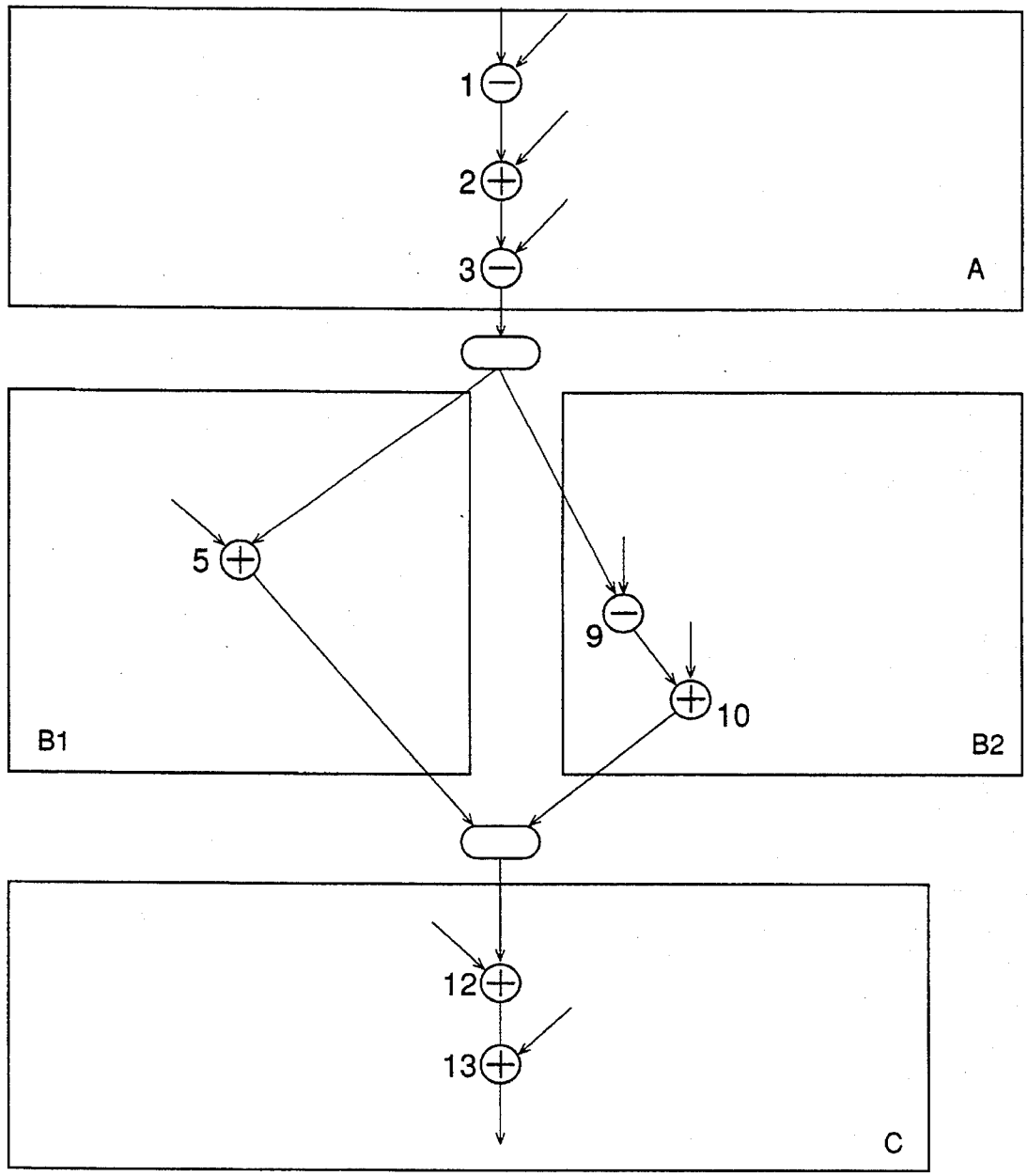
FIG. 28 shows the critical paths of FIG. 9.

FIG. 28 is the global-level critical paths obtained by integrating the critical paths on the block-group level shown in FIGS. 24 and 25.

step 5
Extraction of the global-level mobility

FIGS. 26 and 27 show the operator mobility on the block-group level obtained as a result of applying the algorithm of FIG. 10 to the block groups shown in FIGS. 16 and 15, respectively. FIG. 29 is a global-level mobility table.

step 5-1
Extraction of inter-block mobility

In this step, all the combinations of blocks within which a movable operator may activated are extracted. The step is conducted in the following manner.

Figure 31A:
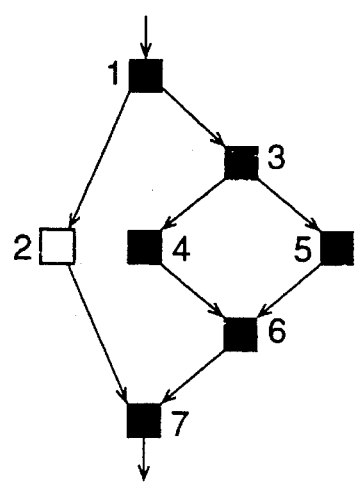
FIG. 31A shows an example of block relationship.
Figure 31B:
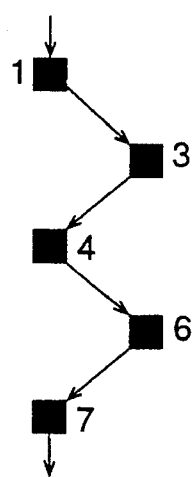
FIG. 31B is an illustration of inter-block mobility derived from FIG. 31A.
Figure 31C:
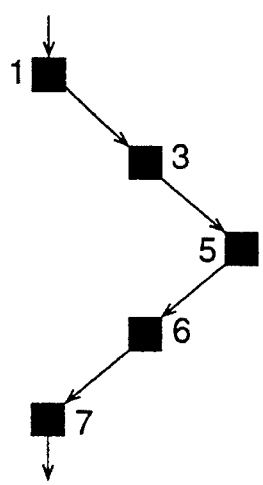
FIG. 31C is another illustration of inter-block mobility derived from FIG. 31A.

① Block ID numbers on all the possible processing routes that include in its path a movable operator(s) are extracted. For example, if a block flow relationship shown in FIG. 31A is given and it is known that a movable operator in the block 6 may be moved in a range bounded by the block 1 at one end and by the block 7 at the other end, the route shown in FIG. 31B and the route shown in FIG. 31C are extracted. The extraction result is expressed in block ID numbers (in this case, 1, 3, 4, 5, 6 and 7).

② The mobility between the top block and the block to which the target operator belongs as well as the mobility between the block to which the target operator belongs and the bottom block are extracted by the following steps. Then, the results are integrated.

In an example of a block flow relationship in FIG. 31A, to extract all the combinations of blocks within which a movable operator in the block 6 may be activated, the mobility between the top block 1 and the block 6 as well as the mobility between the block 6 and the bottom block 7 are extracted and integrated.

③ Extraction of the mobility between the block a and the block b.

③ -1 If the block a and the block b are the same, the block a is output as a result.

③ -2 The inter-block dependencies are examined. If there is no block dependent on the block a, NULL is output as a result.

③ -3 If there is one block which is dependent on the block a and which resides on the route including the target operator, the extraction result of the mobility between the dependent block and the block b is superimposed on the extraction result containing only the block a as its constituent.

③ -4 If there are two or more blocks which are dependent on the block a and which reside on the route including the target operator, the mobilities between the dependent blocks and the block b are extracted and integrated. To execute the integration, all the constituents of the mobility result are checked. If the block numbers of the constituents are not the same, these are combined, and, if they are the same, the block number is superimposed on the other result. For example, if one mobility result is the block 1 and the combination of the blocks 2 and 3 (1, 2/3) and the other mobility result is the block 1 and the block 4 (1, 4), the integration result is the block 1 (1) and the combination of the blocks 2, 3 and 4 (2/3/4), that is, (1, 2/3/4). This integration result is superimposed on the extraction result containing only the block a as its constituent.

In FIG. 31A example, the mobility between the block 1 and the block 6 is extracted in the following manner.

First, because there is one block 3 which is dependent on the block 1 and which resides on the route including the target operator, the extraction result of the mobility between the block 3 and the block 6 is superimposed on the result (1). This (1) means the extraction result containing only the block 1 as its constituent.

Second, the mobility between the block 3 and the block 6 is extracted. Because there are two blocks 4 and 5 which are dependent on the block 3 and reside on the route including the target operator, the extraction result of the mobility between the block 4 and the block 6 as well as the mobility between the block 5 and the block 6 are extracted and integrated. In this case, the former result is (4, 6) and the latter result is (5, 6) and the integration result is (4/5, 6).

This integration result (4/5, 6) is superimposed on (3). As a result, the mobility between the block 3 and the block 6 is (3, 4/5, 6).

Finally, the extraction result (3, 4/5, 6) is superimposed on (1). As a result, the mobility between the block 1 and the block 6 is (1, 3, 4/5, 6).

The final integration result is expressed as the combination of block ID's (in this case, 1, 3, 4/5, 6).

step 5-2

Extraction of the global-level operator mobility

First, the mobility results of the operators are combined to get a global-level mobility table like FIG. 29.

For example, FIG. 29 is extracted by combining the tables of FIG. 26 and FIG. 27.

Second, an inter-block mobility table is extracted based on a global-level mobility table (FIG. 29) and the result of the step 5-1.

An inter-block mobility table like FIG. 32 is represented as a combination of the ID's of the blocks in which a given movable operator can occur and the ID's of the operators with which it can concur.

Third, if the operator ID of the global-level mobility result is not included in the operator ID's in an inter-block mobility table, the operator ID belongs to concurrently executable reference operators in FIG. 30.

Fourth, the operator ID's in an inter-block mobility table on each block are combined to each other and registered as concurrently executable reference operators in FIG. 30.

For example, FIG. 32 shows that the operator 14 is copied to the blocks B1 and B2, and that the operator 14 can concur with the operator 5 in the block B1, or with the operator 9 or 10 in the block B2. It is to be noted that the operators 5, 9 and 10 are operators on the critical path. In this case, the operator 5 in the block B1 and the operator 9 or 10 in the block B2 are combined and the combinations of the operators 5 and 9 and the operators 5 and 10, that is, (9/10, 5/10), are extracted. Finally, FIG. 30 is extracted. FIG. 30 tells us that it can concur with any of the operators 1, 2, 3, 12, 5/9 and 5/10.

In the conventional scheduling method, the control step ID's, instead of the critical-path operator ID's, are corresponded with the operators to be allocated. This is effective if there are no branches involved but fails to be specific about the sequencing of the allocation. In the above example, the conventional method can not readily determine which of the two operators 5 and 9 the operator 14 should be executed first.

A description will now be given of the scheduling employed when a circuit having the architecture shown in FIG. 6 is automatically synthesized.

A reference operator is an operator residing on the critical path, and a movable operator is an operator which does not reside on the critical path. Scheduling is defined as a process whereby a movable operator is assigned to a reference operator with which it may concur (that is, executed at the same cycle time). The overall sequence of the execution depends on the dependencies between the reference operators.

FIGS. 34–49 show tables that are generated during the scheduling. Of these table, FIGS. 34–41 show reference operator tables. These tables tabulate the reference operators versus the movable operators which may be allocated thereto. For example, in the reference operator table of FIG. 34, the movable operators 4, 7, 8, 14 and 15 may be allocated to the reference operator 2. A parameter called an allocation finalization flag is introduced in these tables. The allocation finalization flag indicated whether or not the allocation of a movable operator to a reference operator has been done and are identified as (0), (1) and (2) in the tables. (0) indicates that the allocation has not been done. (1) indicates the allocation to the reference operator associated with the flag has been done. (2) indicates the allocation to a reference operator other than that associated with the flag has been done.

FIGS. 42–49 show movable operator tables, where the reference operators and the combinations of the reference operators are listed with respect to each of the movable operators which are listed in the top row. These tables show which reference operator or combination of reference operators a movable operator may be allocated to.

For example, it will be learned from FIG. 42 that the movable operator 14 may be allocated to the reference operator(s) 9/5, 10/5, 1, 2, 3 or 12.

A description will now be given of the parameters introduced in these tables.

(1) Allocation finalization indicator of a reference operator

An allocation finalization indicator is a number obtained by adding the number of movable operators allocated to a reference operator and the number of movable operators allocated to other reference operators.

(2) Allocation finalization point

An allocation finalization point is a parameter obtained by subtracting the allocation indicator of a reference operator from the maximum value of the allocation finalization indicators of all the reference operators. A reference operator which has a greater allocation finalization point than another reference operator is deemed to have a greater margin for the allocation.

(3) Allocation point

An allocation point of a reference operator denotes the number of movable operators which are not allocated to the reference operator. The allocation point of a reference operator can be obtained by counting the occurrences of (0) for the reference operator. The smaller an allocation point, the lower the likelihood that a movable operator is allocated to the reference operator associated with that allocation point.

(4) Allocation completion flag

An allocation completion flag of a movable operator indicates whether or not the movable operator has been allocated to any reference operator. The flag 1 is provided when the allocation has been done, and the flag 0 is provided when the allocation has not been done.

(5) Allocation margin point

An allocation margin point of a movable operator is a total of the allocation points of the reference operators to which the movable operator may be allocated. The greater an allocation margin point, the more the possible allocations.

Figure 33:
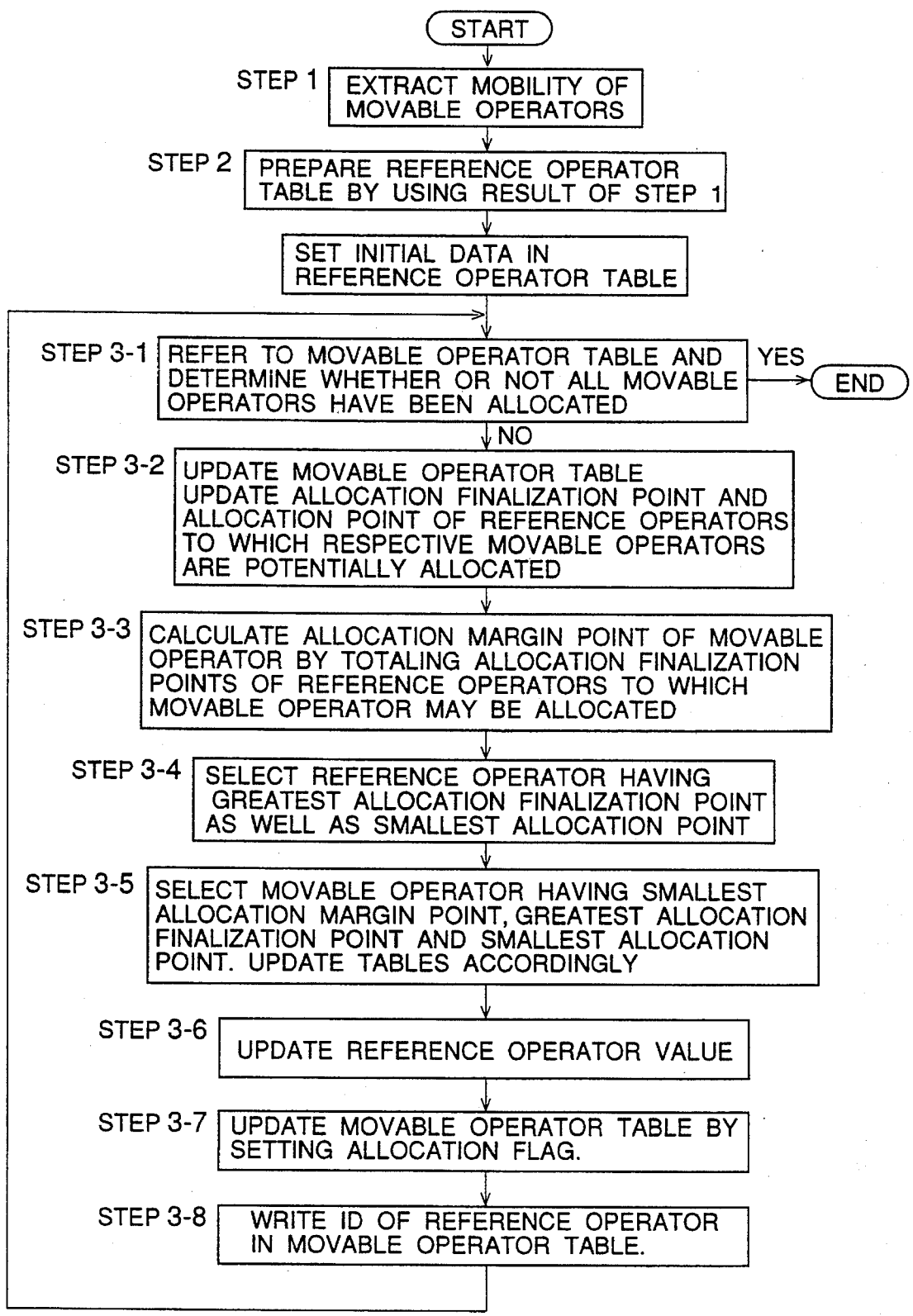
FIG. 33 shows an algorithm of sequential allocation scheme employed in the scheduling of the present invention.

FIG. 33 shows an algorithm employed in the scheduling based on the sequential allocation scheme. A description will be given of the steps in the algorithm.

step 1

Extract the mobility of a movable operator.

step 2

Prepare a reference operator table such as the one shown in FIG. 34 on the basis of the result obtained in step 2, and the initial values are provided in the table.

Thereafter, the following steps are conducted until all the movable operators are allocated to the respective execution step.

step 3-1

A determination is made as to whether or not the allocation of all the movable operators has been done. If it has been done, the scheduling is terminated.

step 3-2

Update the movable operator table. Update the allocation finalization point and the allocation point of each of the reference operators to which the respective movable operators are potentially allocated.

step 3-3

Calculate the allocation margin point of a movable operator by totaling the allocation finalization points of the reference operators to which the movable operator may be allocated.

step 3-4

Select the reference operator having the greatest allocation finalization point as well as the smallest allocation point for the respective movable operators and write them in the bottom row of the movable operator table. The bottom row of FIGS. 42–49 list those reference operators selected for the respective movable operators which have not yet been allocated. Referring to FIG. 42, it is noted that the reference operator 1 (having the allocation finalization point of 0 and the allocation point of 4) is selected for the movable operator 4. In other words, the allocation finalization point of 0 and the allocation point of 4 are associated with the movable operator 4.

step 3-5

As a result of the above steps, each of the movable operator that have not yet been allocated is associated with three parameters: the two parameters (the allocation finalization point and the allocation point) obtained in the step 3-4; and the one parameter (the allocation margin point) obtained in the step 3-3. A comparison of the movable operators is made with respect to these three parameters so as to determine a movable operator which is to be allocated in the current step. The rule is that the movable operator to be selected must have the smallest allocation margin point, the greatest allocation finalization point and the smallest allocation point. The priority is given to the allocation margin point, the allocation finalization point and the allocation point, in the stated order. When there are a plurality of candidates having the same priority point-wise, an arbitrary selection may be made. Usually, the movable operator with the lowest ID number is selected. The movable operator thus selected is allocated to the reference operator. For example, referring to FIG. 42, the movable operator 14 is allocated first because it is associated with the reference operators (the operators 5 and 10) having the smallest allocation point.

step 3-6

Update the movable operator table by setting the allocation completion flag appropriately. For example, the allocation completion flag for the operator 14 in FIG. 42 is updated, with the result that FIG. 43 is obtained.

step 3-7

Write ID of the reference operator selected in the step 3-5 in the movable operator table. For example, it will be noted that FIG. 43 shows that the operator 14 is to be allocated to the operators 5 and 10, that is, 5/10, in the fourth row from the top.

Figure 50:
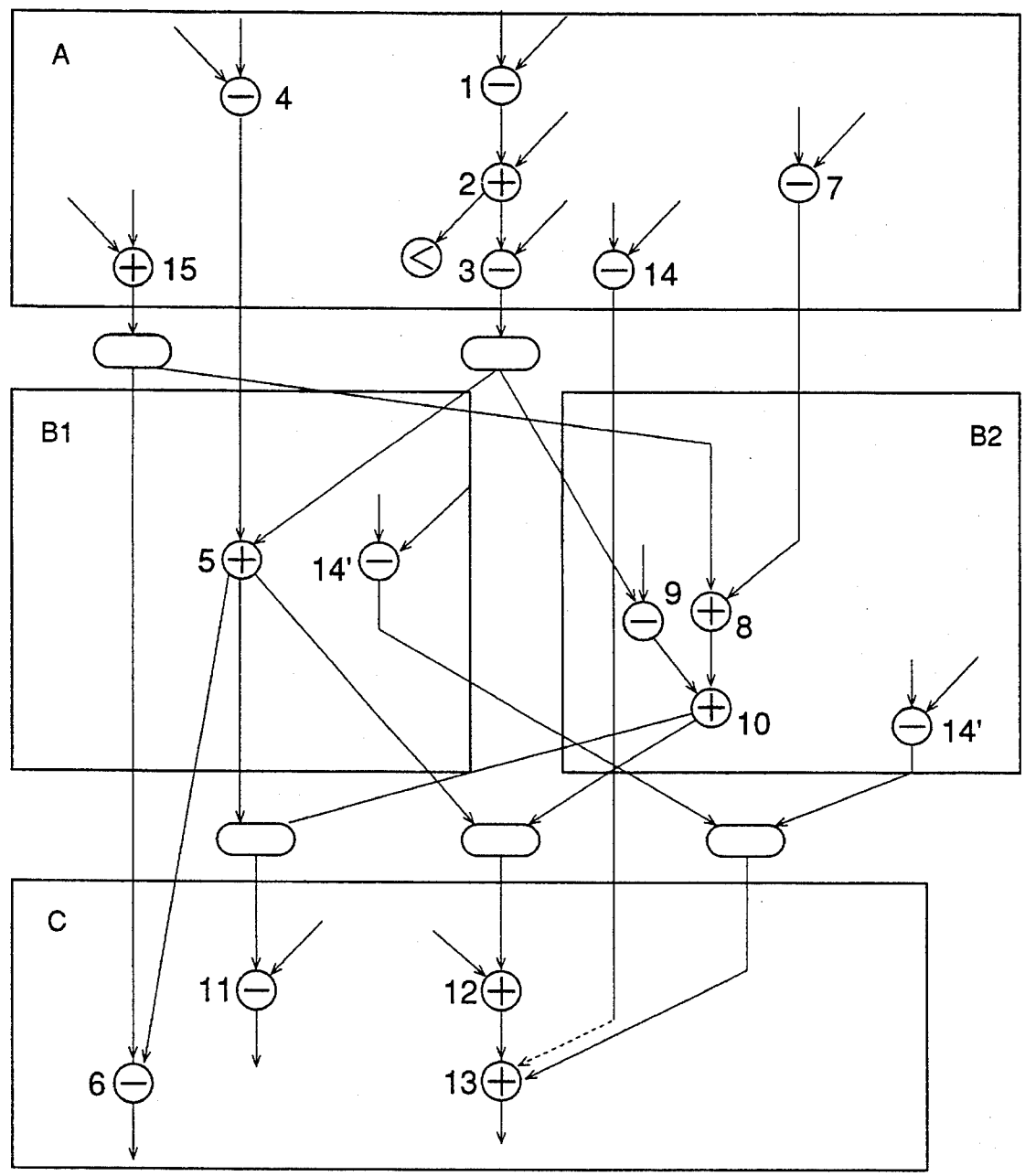
FIG. 50 shows a scheduling result of the present invention.

FIGS. 34–49 show step-by-step how the reference operator table and the movable operator table are updated as the steps are repeated. FIG. 50 shows the final result of scheduling.

Referring to FIG. 50, the operator 14 is scheduled so as to be executed both within the block B1 and the block B2. In this case, the number of arithmetic units is two. If the copying is not allowed, the operator 14 is scheduled so as to be executed in block A and C. The broken line shows one of these cases. It indicates that the operator 14 is to be activated in the block A. In this case, the number of arithmetic units is three.

A description will now be given of a variation of the present invention.

The movable operator table is referred to and the dependencies between the operators is examined so as to extract the allocation of the movable operators that best meets the area requirement while observing predetermined conditions.

Figure 51:
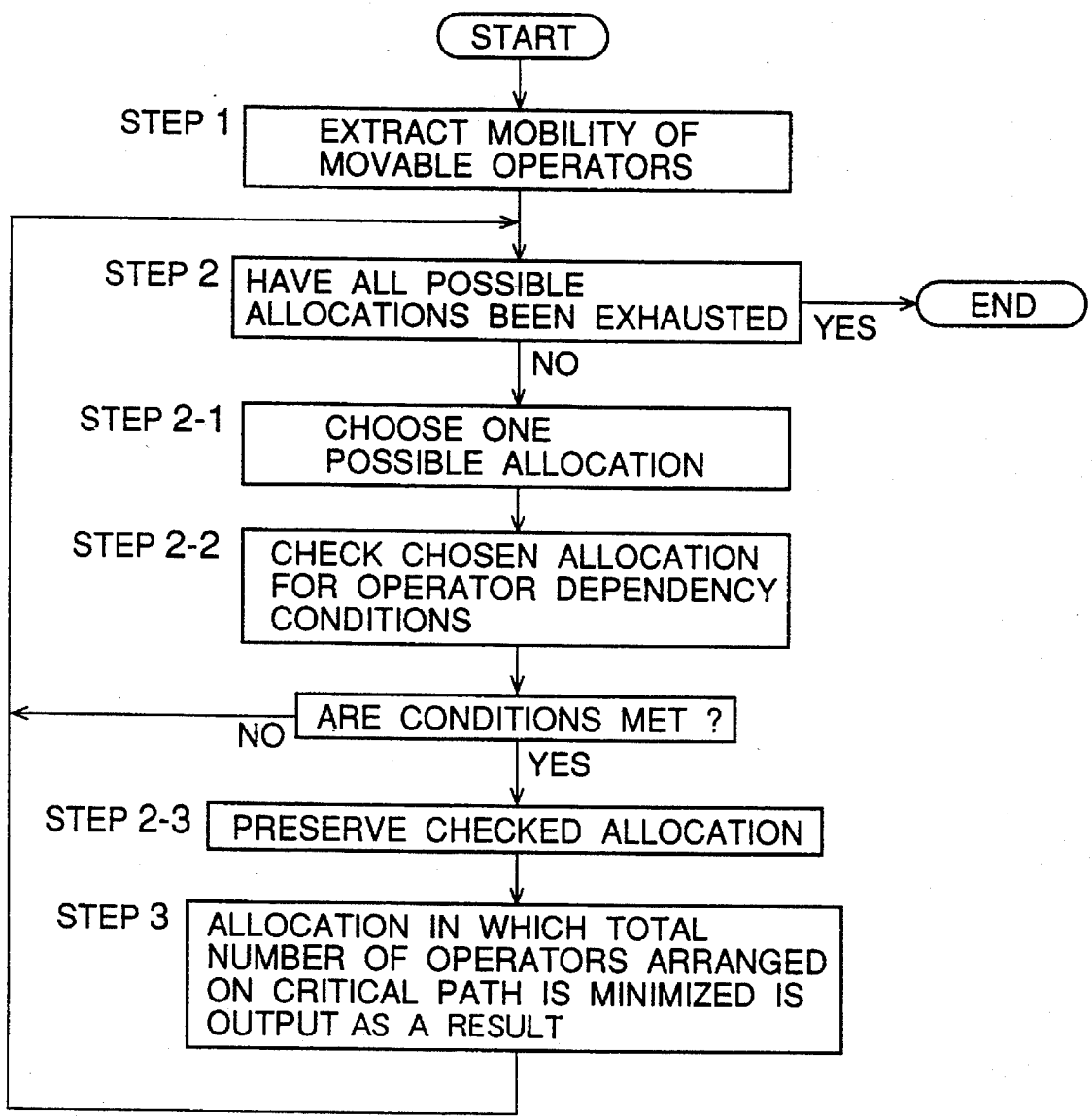
FIG. 51 shows an algorithm for a scheduling method featuring exhaustive extraction.

FIG. 51 shows an algorithm for a scheduling method featuring an exhaustive extraction. A description will now be given of the steps executed in this scheduling method.

step 1

The mobility of the movable operators is extracted (see FIG. 30).

step 2-1

One of the possible allocations is extracted.

step 2-2

Check the dependencies between the operators.

Since the operator allocation is specified in the form of a series of operators on the critical path, it is possible to see if a predetermined conditions (requirements) specifying the dependencies to be observed between operators are observed or not by examining whether or not the operators are arranged on the critical path in such a manner as indicated by the predetermined operator dependency conditions.

step 2-3

If the allocation passed the test in the step 2-2, it is preserved.

step 3

The most appropriate allocation is returned (output) as the final scheduling result. Specifically the allocation in which the total number of operators arranged on the critical path is minimized is output as the result.

A description will now be given of another variation of the present invention.

Figure 52:
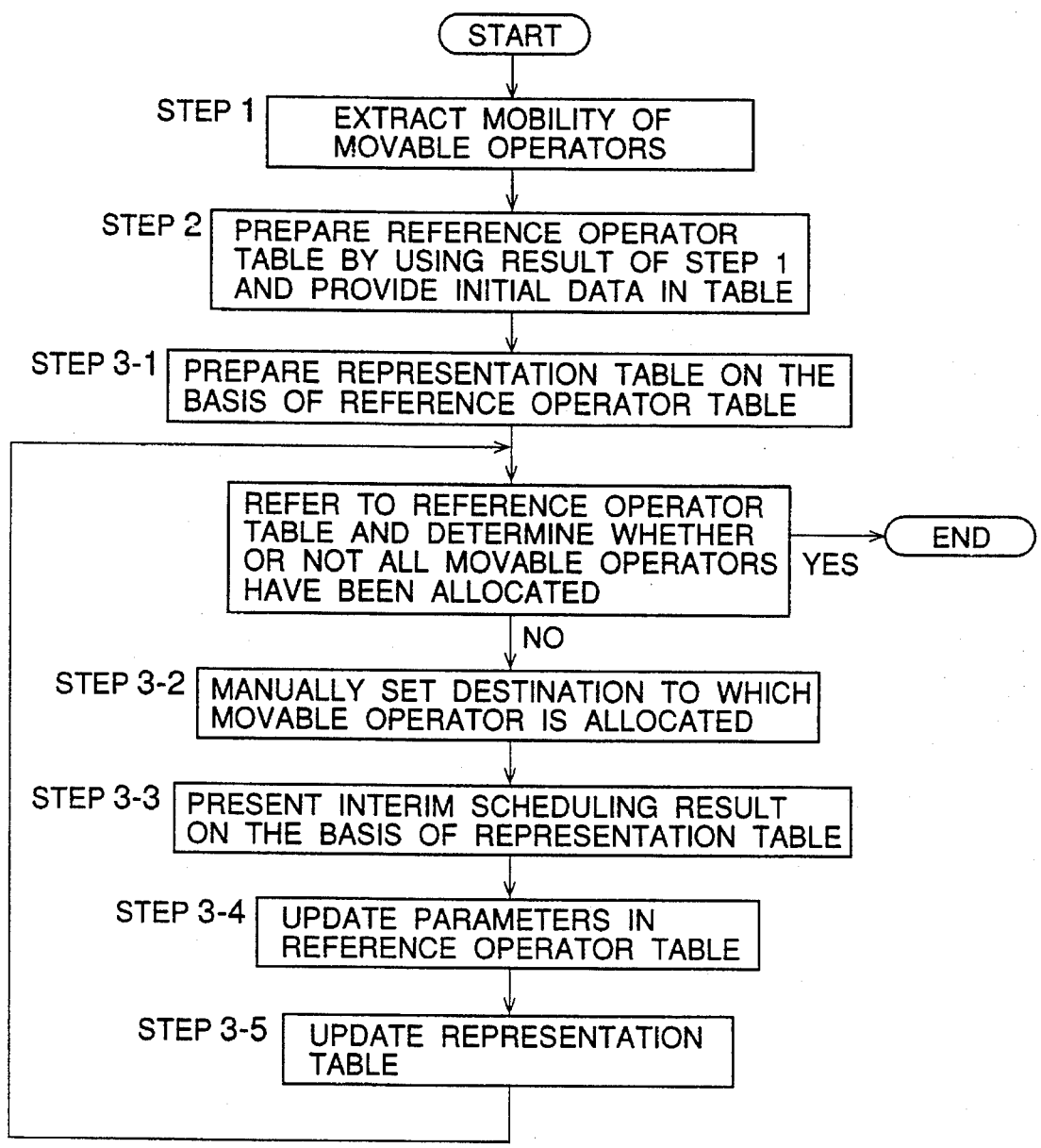
FIG. 52 shows an algorithm for a manual scheduling method.

FIG. 52 is an algorithm employed in the manual scheduling method. The steps executed in this scheduling method will be explained.

step 1

Extract the mobility of the movable operators.

step 2

Prepare the reference operator table (see FIG. 34) and a representation table shown in FIG. 53A on the basis of the result obtained in the step 1, whereupon the initial data are provided in the tables.

step 3-1

Refer to the contents of the reference operator table and a determination is made as to whether or not all the movable operators have been allocated. If they have, the scheduling is terminated.

step 3-2

Manually set the destination to which a movable operator is allocated.

step 3-3

An interim scheduling result is presented on the basis of the representation table (see FIG. 53B).

step 3-4

Update the parameters in the reference operator table. Set the appropriate allocation finalization flag in the reference table.

step 3-5

Update the representation table.

A description will now be given of another variation of the present invention.

In this embodiment, a discrimination is made between the types of operators and the scheduling is performed in the chains of dependencies between operators of the same type.

Figure 5:
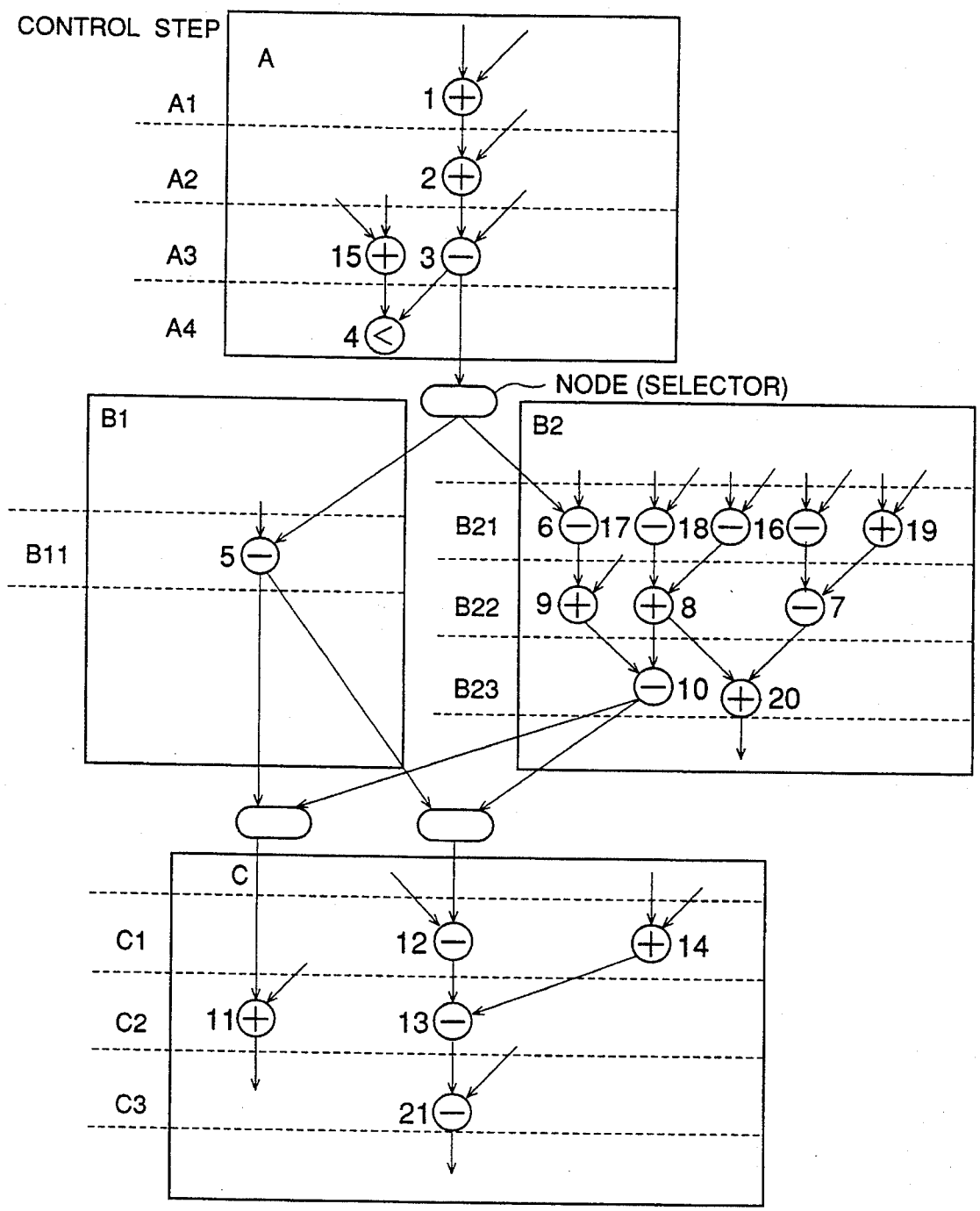
FIG. 5 shows an example of conventional scheduling result.
Figure 54:
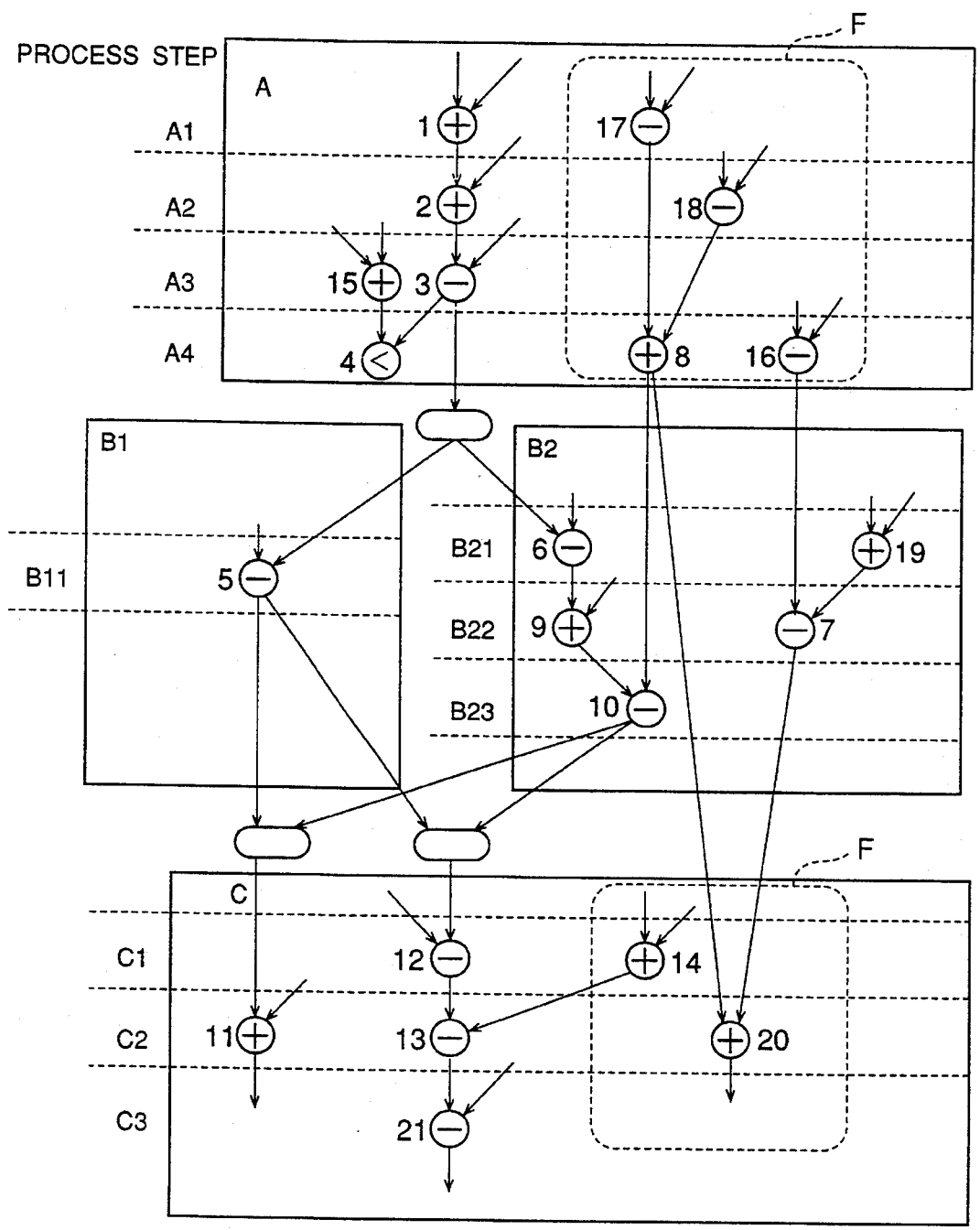
FIG. 54 shows a global-level scheduling result according to the present invention.

FIG. 54 shows the result of the scheduling according to this embodiment. Referring to FIG. 54, it will be noted that the portion F is made to depart from the block B2 to which it originally belongs and transferred to another block. If the scheduling result shown in FIG. 54 is compared with the one shown in FIG. 5 obtained by the conventional scheduling method, it will be appreciated that the number of operators required is reduced since FIG. 54 shows that there are only two operators needed in the control step B21.

The present invention is not limited to the above described embodiments, and variations and modifications may be made without departing from the scope of the present invention.

What is claimed is:

1. A method for obtaining a hardware pattern of a microprocessor based upon a program that is processed by said microprocessor, said microprocessor including a plurality of arithmetic units and a control unit that controls said plurality of arithmetics units independently, said method comprising the steps of:

extracting a plurality of traces from a given program having at least one branching step, each of said plurality of traces being defined at least in part by a plurality of program blocks configured for sequential execution, each of said plurality of program blocks having at least one operator to be executed by said arithmetic units during a control operation having processing steps, and arranged such that, at least one of said plurality of program blocks is separated from another of said plurality of program blocks in an associated trace by the at least one branching step for causing a branching of the control operation to or from a program block associated with another of said plurality of traces;

extracting a critical path represented by the operators in each of said plurality of traces, said critical path being defined by a plurality of reference operators from said one or more operators, the rest of the one or more operators defining movable operators executable concurrently with one or more of the plurality of reference operators during the control operation;

scheduling the processing steps of the movable operators in each of said plurality of traces based upon the at least one branching step, such that upon executing the control operation, the maximum number of the movable operators executed concurrently with a reference operator in a given trace is minimized; and copying a movable operator in one of said plurality of blocks included in said associated trace to one of a plurality of program blocks included in said another trace.

2. A method as claimed in claim 1, wherein said step of scheduling comprises the steps of: obtaining a number of the one or more movable operators executed concurrently to a reference operator for each of the plurality of reference operators and for each possible combination of the movable operators and the reference operators; and selecting the combination wherein the maximum of the number of the movable operators conducted concurrently to a reference operator is minimized.

3. A method as claimed in claim 1, wherein said step of scheduling comprises the step of allocating the movable operators to a reference operator in which the number of the possible movable operators allocatable thereto is minimum.

4. A method as claimed in claim 3, wherein said step of scheduling comprises the step of allocating the movable operators to a reference operator in which the number of the movable operators already allocated thereto is minimum.

5. A method as claimed in claim 4, wherein said step of allocating the movable operators comprises the steps of: identifying a maximum reference operator having the maximum number of allocated movable operators in said trace; and allocating a movable operator to a selected reference operator in said trace such that the difference in the number of allocated movable operators between said maximum reference operator and said selected reference operator, becomes maximum.

6. A method as claimed in claim 3, wherein said step of scheduling comprises the step of allocating the movable operators to a reference operator, starting from the movable operator that has a smallest degree of freedom of scheduling.

* * * * *